United States Patent
Yamada et al.

(10) Patent No.: US 8,238,060 B2
(45) Date of Patent: *Aug. 7, 2012

(54) MAGNETIC RECORDING HEAD AND MAGNETIC RECORDING APPARATUS

(75) Inventors: Kenichiro Yamada, Tokyo (JP); Hitoshi Iwasaki, Kanagawa-ken (JP); Junichi Akiyama, Kanagawa-ken (JP); Masayuki Takagishi, Tokyo (JP); Tomomi Funayama, Saitama-ken (JP); Masahiro Takashita, Kanagawa-ken (JP); Mariko Shimizu, Kanagawa-ken (JP); Shuichi Murakami, Tokyo (JP); Tadashi Kai, Tokyo (JP)

(73) Assignee: Kabushiki Kaisha Toshiba

( * ) Notice: Subject to any disclaimer, the term of this patent is extended or adjusted under 35 U.S.C. 154(b) by 0 days.

This patent is subject to a terminal disclaimer.

(21) Appl. No.: 12/780,269

(22) Filed: May 14, 2010

(65) Prior Publication Data

US 2010/0220415 A1 Sep. 2, 2010

Related U.S. Application Data

(62) Division of application No. 12/155,329, filed on Jun. 2, 2008, now Pat. No. 7,957,098.

(30) Foreign Application Priority Data

Aug. 22, 2007 (JP) .................................. 2007-215594

(51) Int. Cl.
*G11B 5/147* (2006.01)
*G11B 5/23* (2006.01)
*G11B 5/187* (2006.01)

(52) U.S. Cl. ..................................... 360/125.3; 360/128
(58) Field of Classification Search ............... 360/125.3, 360/125.31, 125.71, 125.74, 128
See application file for complete search history.

(56) References Cited

U.S. PATENT DOCUMENTS

| | | | |
|---|---|---|---|
| 4,103,315 A | 7/1978 | Hempstead et al. |
| 4,945,528 A | 7/1990 | Crasemann |
| 5,695,864 A | 12/1997 | Slonczewski |
| 5,748,399 A | 5/1998 | Gill |
| 5,768,066 A | 6/1998 | Akiyama et al. |
| 5,898,546 A | 4/1999 | Kanai et al. |
| 5,920,447 A | 7/1999 | Sakata et al. |
| 6,011,664 A | 1/2000 | Kryder et al. |

(Continued)

FOREIGN PATENT DOCUMENTS

JP 64-070947 3/1989

(Continued)

OTHER PUBLICATIONS

Jian-Gang Zhu et al., "Microwave Assisted Magnetic Recording (MAMR)", *The Magnetic Recording Conference (TMRC2007)*, May 2007, pp. 34-35.

(Continued)

*Primary Examiner* — Will J Klimowicz
(74) *Attorney, Agent, or Firm* — Nixon & Vanderhye, P.C.

(57) ABSTRACT

A magnetic recording head includes: a main magnetic pole; a laminated body; and a pair of electrodes. The laminated body includes a first magnetic layer having a coercivity lower than magnetic field applied by the main magnetic pole, a second magnetic layer having a coercivity lower than the magnetic field applied by the main magnetic pole, and an intermediate layer provided between the first magnetic layer and the second magnetic layer. The pair of electrodes are operable to pass a current through the laminated body.

15 Claims, 27 Drawing Sheets

U.S. PATENT DOCUMENTS

| | | | |
|---|---|---|---|
| 6,094,328 | A | 7/2000 | Saito |
| 6,153,062 | A | 11/2000 | Saito et al. |
| 6,278,576 | B1 | 8/2001 | Ogata et al. |
| 6,282,069 | B1 | 8/2001 | Nakazawa et al. |
| 6,519,119 | B1 | 2/2003 | van der Heijden et al. |
| 6,580,589 | B1 | 6/2003 | Gill |
| 6,583,969 | B1 | 6/2003 | Pinarbasi |
| 6,591,479 | B2 | 7/2003 | Nakazawa et al. |
| 6,608,739 | B1 | 8/2003 | Tanaka et al. |
| 6,621,664 | B1 | 9/2003 | Trindade et al. |
| 6,697,231 | B1 | 2/2004 | Kikuiri |
| 6,785,092 | B2 | 8/2004 | Covington et al. |
| 6,809,900 | B2 | 10/2004 | Covington |
| 6,927,952 | B2 | 8/2005 | Shimizu et al. |
| 6,937,446 | B2 | 8/2005 | Kamiguchi et al. |
| 6,977,108 | B2 | 12/2005 | Hieda et al. |
| 6,982,845 | B2 | 1/2006 | Kai et al. |
| 7,106,555 | B2 | 9/2006 | Kikuiri et al. |
| 7,119,990 | B2 | 10/2006 | Bajorek et al. |
| 7,145,752 | B2 | 12/2006 | Ueda et al. |
| 7,154,707 | B2 | 12/2006 | Watabe et al. |
| 7,256,955 | B2 * | 8/2007 | Pokhil et al. .................... 360/68 |
| 7,397,633 | B2 * | 7/2008 | Xue et al. .................... 360/125.3 |
| 7,461,933 | B2 | 12/2008 | Deily et al. |
| 7,466,525 | B2 | 12/2008 | Hasegawa et al. |
| 7,471,491 | B2 | 12/2008 | Sato et al. |
| 7,473,478 | B2 | 1/2009 | Sbiaa et al. |
| 7,486,475 | B2 | 2/2009 | Biskeborn |
| 7,504,898 | B2 | 3/2009 | Fukuzawa et al. |
| 7,532,433 | B2 | 5/2009 | Kawato et al. |
| 7,532,434 | B1 | 5/2009 | Schreck et al. |
| 7,593,185 | B2 | 9/2009 | Yazawa |
| 7,616,412 | B2 | 11/2009 | Zhu et al. |
| 7,675,129 | B2 | 3/2010 | Inomata et al. |
| 7,724,469 | B2 * | 5/2010 | Gao et al. .................... 360/125.3 |
| 7,732,881 | B2 | 6/2010 | Wang |
| 7,764,136 | B2 | 7/2010 | Suzuki |
| 7,791,829 | B2 | 9/2010 | Takeo et al. |
| 7,808,330 | B2 | 10/2010 | Fukuzawa et al. |
| 7,911,882 | B2 | 3/2011 | Shimazawa et al. |
| 7,957,098 | B2 | 6/2011 | Yamada et al. |
| 2001/0017752 | A1 | 8/2001 | Hoshiya et al. |
| 2002/0006013 | A1 * | 1/2002 | Sato et al. .................... 360/126 |
| 2002/0051330 | A1 * | 5/2002 | Heijden et al. .................... 360/324 |
| 2002/0075595 | A1 * | 6/2002 | Sato et al. .................... 360/126 |
| 2002/0097536 | A1 | 7/2002 | Komuro et al. |
| 2002/0136927 | A1 | 9/2002 | Hieda et al. |
| 2003/0026040 | A1 | 2/2003 | Covington et al. |
| 2003/0090844 | A1 | 5/2003 | Shimizu et al. |
| 2004/0150912 | A1 | 8/2004 | Kawato et al. |
| 2004/0190197 | A1 | 9/2004 | Watabe et al. |
| 2004/0228045 | A1 | 11/2004 | Hasegawa et al. |
| 2005/0023938 | A1 | 2/2005 | Sato et al. |
| 2005/0105213 | A1 | 5/2005 | Takeo et al. |
| 2005/0110004 | A1 | 5/2005 | Parkin et al. |
| 2005/0207050 | A1 | 9/2005 | Pokhil et al. |
| 2005/0219771 | A1 | 10/2005 | Sato et al. |
| 2006/0171051 | A1 | 8/2006 | Wachenschwanz et al. |
| 2006/0198047 | A1 | 9/2006 | Xue et al. |
| 2006/0221507 | A1 | 10/2006 | Sato et al. |
| 2007/0063237 | A1 | 3/2007 | Huai et al. |
| 2007/0109147 | A1 | 5/2007 | Fukuzawa et al. |
| 2008/0019040 | A1 | 1/2008 | Zhu et al. |
| 2008/0112087 | A1 | 5/2008 | Clinton et al. |
| 2008/0117545 | A1 | 5/2008 | Batra et al. |
| 2008/0129401 | A1 | 6/2008 | Fukuzawa et al. |
| 2008/0137224 | A1 | 6/2008 | Gao et al. |
| 2008/0150643 | A1 | 6/2008 | Suzuki et al. |
| 2008/0218891 | A1 | 9/2008 | Gubbins et al. |
| 2008/0268291 | A1 * | 10/2008 | Akiyama et al. ............... 428/812 |
| 2008/0304176 | A1 | 12/2008 | Takagishi et al. |
| 2009/0052095 | A1 | 2/2009 | Yamada et al. |
| 2009/0059417 | A1 | 3/2009 | Takeo et al. |
| 2009/0059418 | A1 | 3/2009 | Takeo et al. |
| 2009/0059423 | A1 | 3/2009 | Yamada et al. |
| 2009/0080105 | A1 | 3/2009 | Takashita et al. |
| 2009/0080106 | A1 | 3/2009 | Shimizu et al. |
| 2009/0080120 | A1 | 3/2009 | Funayama et al. |
| 2009/0088095 | A1 | 4/2009 | Kayano |
| 2009/0097167 | A1 | 4/2009 | Sato et al. |
| 2009/0097169 | A1 | 4/2009 | Sato et al. |
| 2009/0115541 | A1 | 5/2009 | Persson et al. |
| 2009/0225465 | A1 | 9/2009 | Iwasaki et al. |
| 2009/0257151 | A1 | 10/2009 | Zhang et al. |
| 2009/0262457 | A1 * | 10/2009 | Rivkin et al. .................. 360/110 |
| 2009/0316303 | A1 | 12/2009 | Yamada et al. |
| 2009/0316304 | A1 | 12/2009 | Funayama et al. |
| 2010/0007992 | A1 | 1/2010 | Yamada et al. |
| 2010/0007996 | A1 | 1/2010 | Iwasaki et al. |
| 2010/0110592 | A1 | 5/2010 | Koui et al. |
| 2010/0134922 | A1 | 6/2010 | Yamada et al. |
| 2010/0220415 | A1 | 9/2010 | Yamada et al. |
| 2011/0038080 | A1 | 2/2011 | Alex et al. |
| 2011/0205655 | A1 | 8/2011 | Shimizu et al. |
| 2011/0299192 | A1 | 12/2011 | Yamada et al. |
| 2011/0300409 | A1 | 12/2011 | Yamada et al. |

FOREIGN PATENT DOCUMENTS

| | | |
|---|---|---|
| JP | 05-20635 | 1/1993 |
| JP | 07-244801 | 9/1995 |
| JP | 2002-100005 | 4/2002 |
| JP | 2002-208744 | 7/2002 |
| JP | 2002-279616 | 9/2002 |
| JP | 2004-192744 | 7/2004 |
| JP | 2004-207707 | 7/2004 |
| JP | 2004-295987 | 10/2004 |
| JP | 2005-108315 | 4/2005 |
| JP | 2005-525663 | 8/2005 |
| JP | 2005-285242 | 10/2005 |
| JP | 2005-310363 | 11/2005 |
| JP | 2006-147023 | 6/2006 |
| JP | 2006-209960 | 8/2006 |
| JP | 2006-209964 | 8/2006 |
| JP | 2006-286855 | 10/2006 |
| JP | 3833512 | 10/2006 |
| JP | 2007-012264 | 1/2007 |
| JP | 2007-035251 | 2/2007 |
| JP | 2007-124340 | 5/2007 |
| JP | 2007-184923 | 7/2007 |
| JP | 2007-193906 | 8/2007 |
| JP | 2008123669 A * | 5/2008 |
| JP | 2008-176908 | 7/2008 |
| KR | 1020030039289 | 5/2003 |
| WO | 2006-101040 | 9/2006 |

OTHER PUBLICATIONS

X. Zhu and J.-G. Zhu, "Bias-Field-Free Microwave Oscillator Driven by Perpendicularly Polarized Spin Current," IEEE Trans. Magn. vol. 42, p. 2670 (2006).

Office Action in Chinese Patent Application No. 2008102100047, dated Feb. 12, 2010, and English-language translation.

Office Action in Korean Patent Application No. 10-2008-82539, dated Apr. 15, 2010, and English-language translation thereof.

U.S. Appl. No. 12/153,490, filed May 20, 2008 to Yamada et al.

U.S. Appl. No. 12/155,473, filed Jun. 4, 2008 to Takagishi et al.

U.S. Appl. No. 12/196,628, filed Aug. 22, 2008 to Takeo et al.

U.S. Appl. No. 12/232,014, filed Sep. 9, 2008 to Iwasaki et al.

U.S. Appl. No. 12/232,391, filed Sep. 16, 2008 to Takashita et al.

U.S. Appl. No. 12/232,392, filed Sep. 16, 2008 to Funayama et al.

U.S. Appl. No. 12/232,469, filed Sep. 17, 2008 to Shimizu et al.

Maat et al., "Magnetotransport properties and spin-torque effects in current perpendicular to the plane spin valves with Co-Fe-Al magnetic layers", Journal of Applied Physics 101, 093905 (2007); May 9, 2007.

Park et al., "Effect of Adjacent Layers on Crystallization and Magnetoresistance in CoFeB/MgO/CoFeB Magnetic Tunnel Junction", IEEE Transactions of Magnetics, vol. 42, No. 10, Oct. 2006.

Shen et al., "Effect of Film Roughness in MgO-based Magnetic Tunnel Junctions", Applied Physics Letters 88, 182508 (2006).

Akiyama et al., U.S. Appl. No. 12/109,760, filed Apr. 25, 2008.

Yamada et al., U.S. Appl. No. 12/155,329, filed Jun. 2, 2008.

Takeo et al., U.S. Appl. No. 12/196,841, filed Aug. 22, 2008.

Yamada et al., U.S. Appl. No. 12/382,940, filed Mar. 26, 2009.

Iwasaki et al., U.S. Appl. No. 12/457,657, filed Jun. 17, 2009.
Takagishi et al., U.S. Appl. No. 12/461,027, filed Jul. 29, 2009.
Yamada et al., U.S. Appl. No. 13/214,012, filed Aug. 19, 2011.

Yamada et al., U.S. Appl. No. 13/214,033, filed Aug. 19, 2011.

* cited by examiner

SUM OF MAGNETIC FIELD
FROM MAIN MAGNETIC POLE AND
DEMAGNETIZING FIELD OF SPIN
INJECTION LAYER

SPIN TORQUE FROM SPIN
INJECTION LAYER

MAGNETIC RECORDING HEAD AND MAGNETIC RECORDING APPARATUS

CROSS-REFERENCE TO RELATED APPLICATIONS

This application is a divisional of application Ser. No. 12/155,329, filed Jun. 2, 2008, now U.S. Pat. No. 7,957,098 and claims the benefit of priority from the prior Japanese Patent Application No. 2007-215594, filed on Aug. 22, 2007; the entire contents of which are incorporated herein by reference.

BACKGROUND OF THE INVENTION

1. Field of the Invention

This invention relates to a magnetic recording head and a magnetic recording apparatus provided with a spin torque oscillator, suitable for using a high-frequency assist magnetic field to realize data storage with high recording density, high recording capacity, and high data transfer rate.

2. Background Art

In the 1990s, the practical application of MR (magnetoresistive effect) heads and GMR (giant magnetoresistive effect) heads triggered a dramatic increase in the recording density and recording capacity of HDD (hard disk drive). However, in the early 2000s, the problem of thermal fluctuations in magnetic recording media became manifest, and hence the increase of recording density temporarily slowed down. Nevertheless, perpendicular magnetic recording, which is in principle more advantageous to high-density recording than longitudinal magnetic recording, was put into practical use in 2005. It serves as an engine for the increase of HDD recording density, which exhibits an annual growth rate of approximately 40% these days.

Furthermore, the latest demonstration experiments have achieved a recording density exceeding 400 Gbits/inch$^2$. If the development continues steadily, the recording density is expected to achieve 1 Tbits/inch$^2$ around 2012. However, it is considered that such a high recording density is not easy to achieve even by using perpendicular magnetic recording because the problem of thermal fluctuations becomes manifest again.

As a recording scheme possibly solving the above problem, the "microwave assisted magnetic recording scheme" is proposed. In the microwave assisted magnetic recording scheme, a high-frequency magnetic field near the resonance frequency of the magnetic recording medium, which is sufficiently higher than the recording signal frequency, is locally applied. This produces resonance in the magnetic recording medium, which decreases the coercivity (Hc) of the magnetic recording medium subjected to the high-frequency magnetic field to less than half the original coercivity. Thus, superposition of a high-frequency magnetic field on the recording magnetic field enables magnetic recording on a magnetic recording medium having higher coercivity (Hc) and higher magnetic anisotropy energy (Ku) (e.g., U.S. Pat. No. 6,011,664, hereinafter referred to as Patent Document 1). However, the technique disclosed in Patent Document 1 uses a coil to generate a high-frequency magnetic field, and it is difficult to efficiently apply a high-frequency magnetic field during high-density recording.

Techniques based on a spin torque oscillator are also proposed as a means for generating a high-frequency magnetic field (e.g., US Patent Application Publication No. 2005/0023938, hereinafter referred to as Patent Document 2; US Patent Application Publication No. 2005/0219771, hereinafter referred to as Patent Document 3). In the techniques disclosed in Patent Documents 2 and 3, the spin torque oscillator comprises a spin injection layer, an intermediate layer, a magnetic layer, and electrodes. When a DC current is passed through the spin torque oscillator via the electrode, the spin torque generated by the spin injection layer produces ferromagnetic resonance in the magnetization of the magnetic layer. Consequently, a high-frequency magnetic field is generated from the spin torque oscillator.

Because the spin torque oscillator has a size of approximately several ten nanometers, the generated high-frequency magnetic field is localized within approximately several ten nanometers around the spin torque oscillator. Furthermore, the perpendicularly magnetized magnetic recording medium can be efficiently resonated by the longitudinal component of the high-frequency magnetic field, allowing a significant decrease in the coercivity of the magnetic recording medium. Consequently, high-density magnetic recording is performed only in a portion where the recording magnetic field of the main magnetic pole is superposed on the high-frequency magnetic field of the spin torque oscillator, allowing utilization of magnetic recording media having high coercivity (Hc) and high magnetic anisotropy energy (Ku). Thus the problem of thermal fluctuations during high-density recording can be avoided.

SUMMARY OF THE INVENTION

According to an aspect of the invention, there is provided a magnetic recording head including: a main magnetic pole; a laminated body including a first magnetic layer having a coercivity lower than magnetic field applied by the main magnetic pole, a second magnetic layer having a coercivity lower than the magnetic field applied by the main magnetic pole, and an intermediate layer provided between the first magnetic layer and the second magnetic layer; and a pair of electrodes operable to pass a current through the laminated body.

According to another aspect of the invention, there is provided a magnetic recording apparatus including: a magnetic recording medium; the magnetic recording head including: a main magnetic pole; a laminated body including a first magnetic layer having a coercivity lower than magnetic field applied by the main magnetic pole, a second magnetic layer having a coercivity lower than the magnetic field applied by the main magnetic pole, and an intermediate layer provided between the first magnetic layer and the second magnetic layer; and a pair of electrodes operable to pass a current through the laminated body; a moving mechanism configured to allow relative movement between the magnetic recording medium and the magnetic recording head which are opposed to each other with a spacing therebetween or in contact with each other; a controller configured to position the magnetic recording head at a prescribed recording position of the magnetic recording medium; and a signal processing unit configured to perform writing and reading of a signal on the magnetic recording medium by using the magnetic recording head.

DETAILED DESCRIPTION OF THE INVENTION

Embodiments of the invention will now be described with reference to the drawings.

First Embodiment

A first embodiment of a microwave assisted magnetic head of the invention is described in the case of recording on a multiparticle medium for perpendicular magnetic recording.

Figure 1:
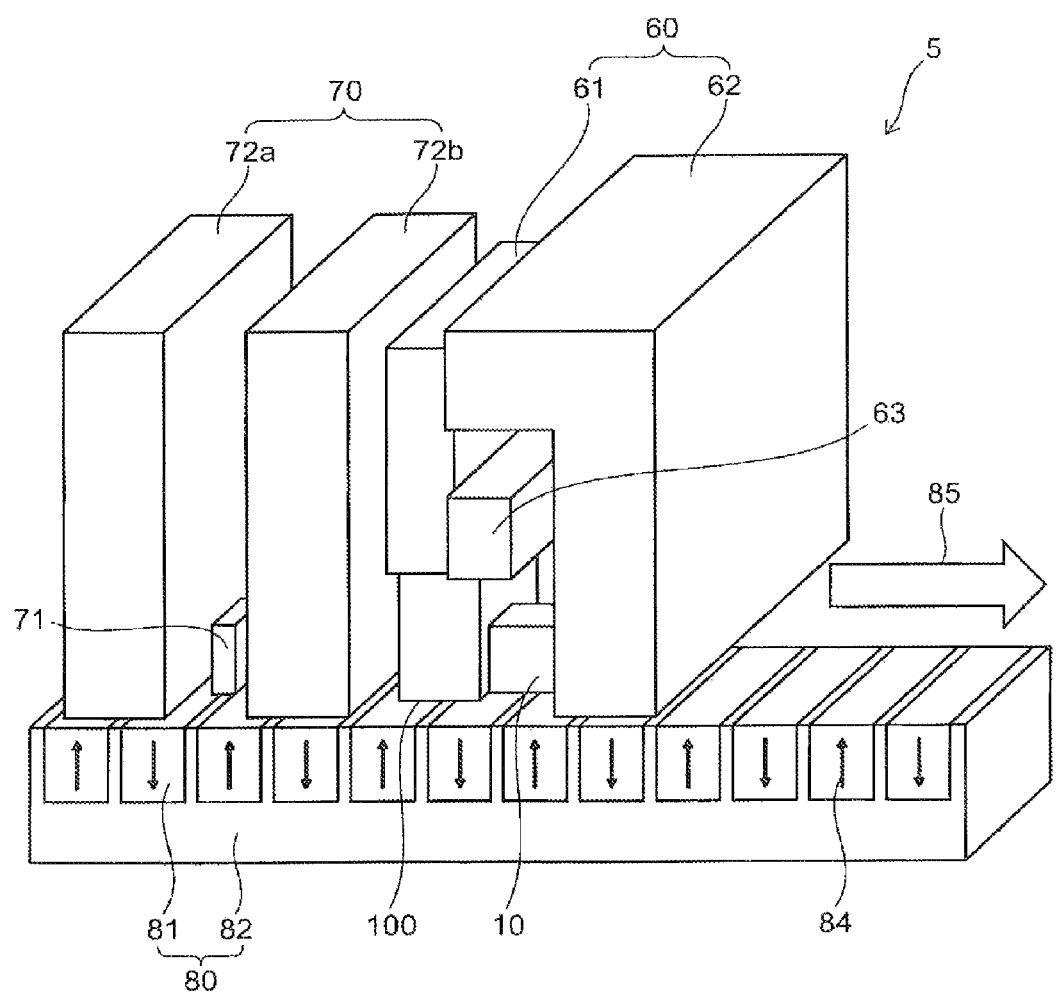
FIG. 1 is a perspective view showing the schematic configuration of a magnetic recording head according to an embodiment of the invention.

FIG. 1 is a perspective view showing the schematic configuration of a magnetic recording head 5 according to the embodiment of the invention.

Figure 2:
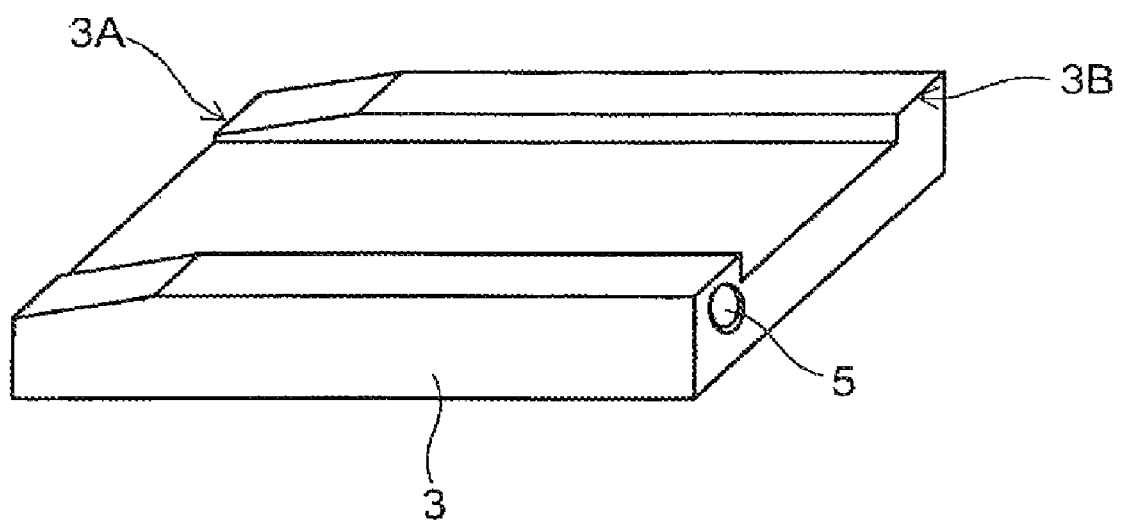
FIG. 2 is a perspective view showing a head slider on which the magnetic recording head is mounted.

FIG. 2 is a perspective view showing a head slider on which the magnetic recording head 5 is mounted.

The magnetic recording head 5 of this embodiment comprises a reproducing head section 70 and a writing head section 60. The reproducing head section 70 comprises a magnetic shield layer 72a, a magnetic shield layer 72b, and a magnetic reproducing device 71 provided between the magnetic shield layer 72a and the magnetic shield layer 72b.

The writing head section 60 comprises a main magnetic pole 61, a return path (shield) 62, an excitation coil 63, and a spin torque oscillator 10. The components of the reproducing head section 70 and the components of the writing head section 60 are separated from each other by alumina or other insulators, not shown. The magnetic reproducing device 71 can be a GMR device or a TMR (tunnel magnetoresistive effect) device. In order to enhance reproducing resolution, the magnetic reproducing device 71 is placed between the two magnetic shield layers 72a and 72b.

The magnetic recording head 5 is mounted on a head slider 3 as shown in FIG. 2. The head slider 3, illustratively made of $Al_2O_3$/TiC, is designed and worked so that it can move relative to a magnetic recording medium (medium) 80 such as a magnetic disk while floating thereabove or being in contact therewith. The head slider 3 has an air inflow side 3A and an air outflow side 3B, and the magnetic recording head 5 is disposed illustratively on the side surface of the air outflow side 3B.

The magnetic recording medium 80 has a medium substrate 82 and a magnetic recording layer 81 provided thereon. The magnetization of the magnetic recording layer 81 is controlled to a prescribed direction by the magnetic field applied by the writing head section 60, and thereby writing is performed. The reproducing head section 70 reads the direction of magnetization of the magnetic recording layer 81.

Figure 3:
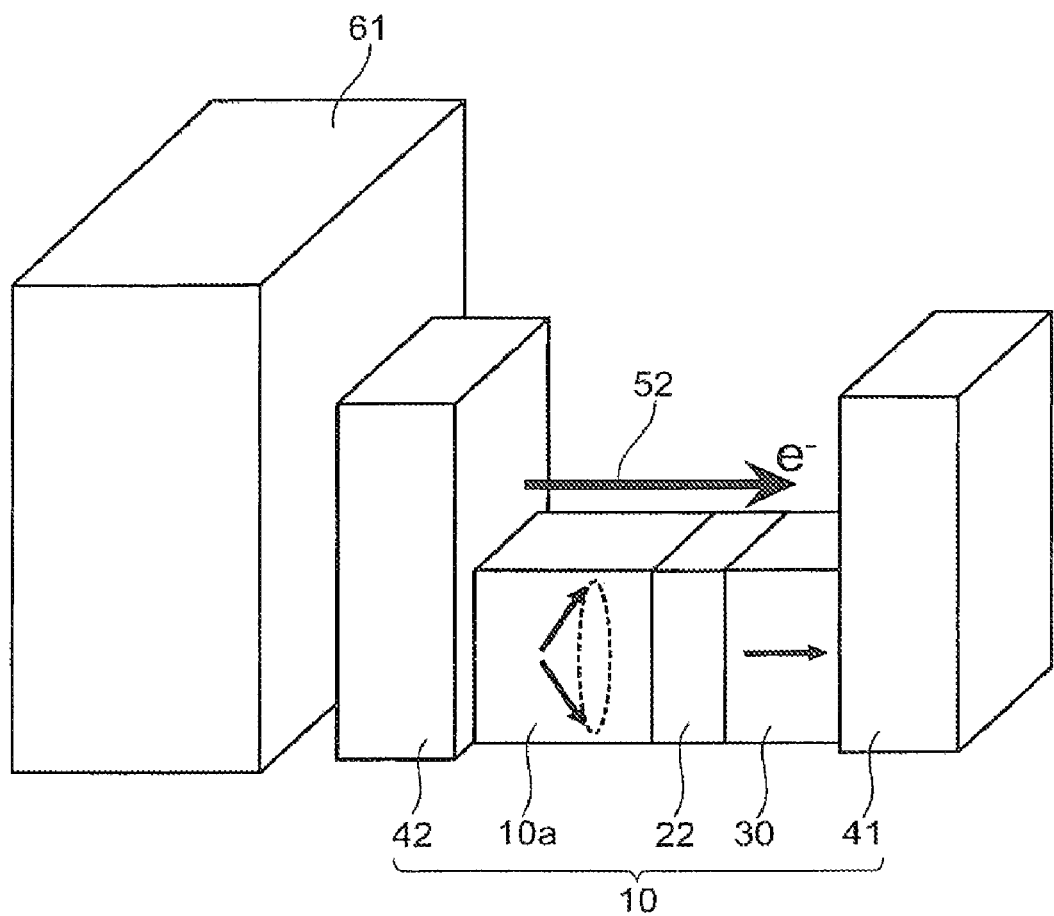
FIG. 3 is a schematic view illustrating the structure of a spin torque oscillator 10 provided in this magnetic recording head.

FIG. 3 is a schematic view illustrating the structure of the spin torque oscillator 10 provided in this magnetic recording head 5.

The spin torque oscillator 10 has a structure in which a first electrode 41, a spin injection layer 30 (second magnetic layer), an intermediate layer 22 having high spin transmissivity, an oscillation layer 10a (first magnetic layer), and a second electrode 42 are laminated in this order. By passing a driving electron flow 52 from this electrode 42 to the electrode 41, a high-frequency magnetic field can be generated from the oscillation layer 10a. The driving current density is preferably from $5\times10^7$ A/cm$^2$ to $1\times10^9$ A/cm$^2$, and suitably adjusted so as to achieve a desired oscillation. That is, the magnetic recording head 5 comprises a laminated body including this spin injection layer 30, the intermediate layer 22 and the oscillation layer 10a, and a pair of electrodes (electrode 41 and electrode 42) operable to pass a current through this laminated body.

The electrode 41 and the electrode 42 can be made of a material having low electrical resistance and being resistant to oxidation such as Ti and Cu.

The intermediate layer 22 can be made of a material having high spin transmissivity such as Cu, Au, and Ag. The thickness of the intermediate layer 22 is preferably from one atomic layer to 3 nm. This can reduce exchange coupling between the oscillation layer 10a and the spin injection layer 30.

The oscillation layer 10a is made of a high-Bs soft magnetic material (FeCo/NiFe laminated film) generating a magnetic field during oscillation. The thickness of the oscillation layer 10a is preferably from 5 nm to 20 nm. The spin injection layer 30 is made of a CoPt alloy with its magnetization oriented perpendicular to the film plane. The thickness of the spin injection layer 30 is preferably from 2 nm to 60 nm.

The spin injection layer 30 and the oscillation layer 10a can be a soft magnetic layer of CoFe, CoNiFe, NiFe, CoZrNb, FeN, FeSi, or FeAlSi having a relatively high saturation magnetic flux density and having magnetic anisotropy in a direction longitudinal to the film plane, or a CoCr-based magnetic alloy film with its magnetization oriented in a direction longitudinal to the film plane. It is also possible to suitably use a material layer having good perpendicular orientation such as a CoCrPt, CoCrTa, CoCrTaPt, CoCrTaNb, or other CoCr-based magnetic layer, a TbFeCo or other RE-TM amorphous alloy magnetic layer, a Co/Pd, Co/Pt, CoCrTa/Pd, or other Co artificial lattice magnetic layer, a CoPt-based or FePt-based alloy magnetic layer, or a SmCo-based alloy magnetic layer, with the magnetization oriented perpendicular to the film plane. More than one of the above materials may be laminated. This is intended for adjusting the saturation magnetic flux density (Bs) and the anisotropy magnetic field (Hk) of the oscillation layer 10a and the spin injection layer 30.

The oscillation layer 10a and the spin injection layer 30 made of the above materials may be laminated via the intermediate layer 22 into a laminated ferri structure in which the above materials have antiparallel magnetizations, or a structure in which the above materials have parallel magnetizations. This is intended for increasing the oscillation frequency of the oscillation layer 10a, and for efficiently magnetizing the spin injection layer 30. In this case, the intermediate layer 22 is preferably made of a noble metal such as Cu, Pt, Au, Ag, Pd, or Ru, or can be made of a nonmagnetic transition metal such as Cr, Rh, Mo, or W.

The magnetic field applied from the main magnetic pole 61 to the spin torque oscillator 10, the coercivity of the spin injection layer 30, and the coercivity of the oscillation layer 10a decrease in this order. By controlling the magnetic field applied to the spin torque oscillator 10, the coercivity of the spin injection layer 30, and the coercivity of the oscillation layer 10a in this manner, the magnetization direction of the spin injection layer 30 and the magnetization direction of the oscillation layer 10a can always be kept parallel irrespective of the direction of the writing magnetic field so that the oscillation layer 10a can oscillate stably.

By way of example, the magnetic field applied from the main magnetic pole 61 to the spin torque oscillator 10 is 5 kOe to 10 kOe, whereas the coercivity of the spin injection layer 30 can be set to e.g. approximately 3000 Oe, and the coercivity of the oscillation layer 10a can be set to e.g. approximately 5 Oe.

As described later, to achieve stable oscillation driven by precession about the magnetization direction, the oscillation layer 10a preferably has equal dimensions in the direction toward the adjacent track and in the direction perpendicular to the air bearing surface (ABS) 100.

In FIG. 3, the lamination is made so that the oscillation layer 10a is adjacent to the main magnetic pole 61. Alternatively, in order to efficiently apply a magnetic field from the main magnetic pole 61 to the spin injection layer 30, the lamination may be made so that the spin injection layer 30 is adjacent to the main magnetic pole 61.

In a writing head consisting only of the main magnetic pole 61, the magnetic field generated from the main magnetic pole 61 is generated primarily between the main magnetic pole 61 and the medium 80 and not sufficiently applied to the spin torque oscillator 10. Thus the magnetic field generated from the main magnetic pole 61 may be lower than the coercivity of the spin injection layer 30. Hence it is preferable to provide a shield 62 for absorbing the magnetic field generated from the main magnetic pole 61. That is, the shield 62 is preferably provided so that the spin torque oscillator 10 is located between the main magnetic pole 61 and the shield 62. In this case, the magnetic field from the main magnetic pole 61 efficiently flows into the shield 62, allowing the magnetic field to be sufficiently applied also to the spin injection layer 30. It is noted that the magnetic field applied to the spin torque oscillator 10 can be optimized by adjusting the distance between the main magnetic pole 61 and the shield 62 and the shape of the main magnetic pole 61. For a large distance between the main magnetic pole 61 and the shield 62, the magnetic field from the main magnetic pole 61 has a perpendicular direction in the medium. However, decreasing this distance allows the magnetic field to be inclined from the perpendicular direction in the medium. The inclined magnetic field has an advantage that the magnetization of the medium can be reversed by a lower magnetic field.

Next, the operation of the microwave assisted magnetic head according to the first embodiment of the invention is described.

FIG. 4 shows graphs illustrating the write operation of the magnetic recording head 5 provided with the spin torque oscillator 10 shown in FIG. 3. FIG. 4A shows the time dependence of the magnetic field applied by the main magnetic pole 61 to the spin torque oscillator 10, FIG. 4B shows the time dependence of the magnetization direction of the spin injection layer 30, FIG. 4C shows the time dependence of the oscillation frequency of the oscillation layer 10a of the spin torque oscillator 10, and FIG. 4D shows the time dependence of the generated magnetic field strength. The oscillation frequency is proportional to the strength of the static magnetic field applied to the oscillation layer 10a.

Figure 4A:
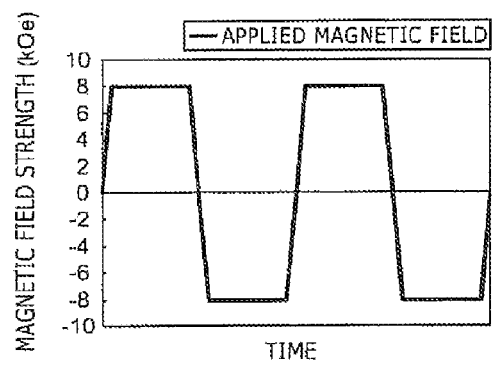
FIGS. 4A to 4D show graphs illustrating the write operation of the magnetic recording head provided with the spin torque oscillator 10 shown in FIG. 3.
Figure 4C:
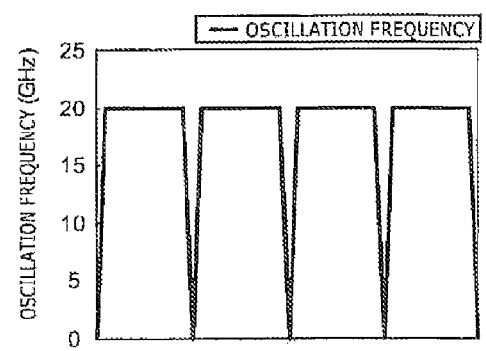
Figure 4B:
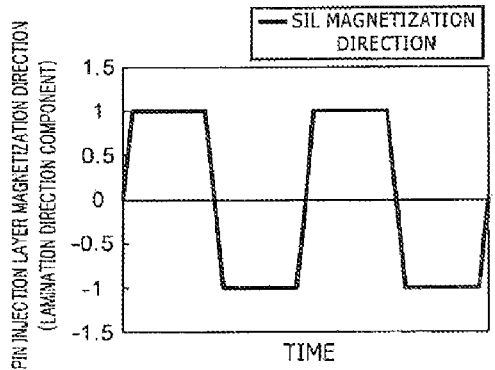
Figure 4D:
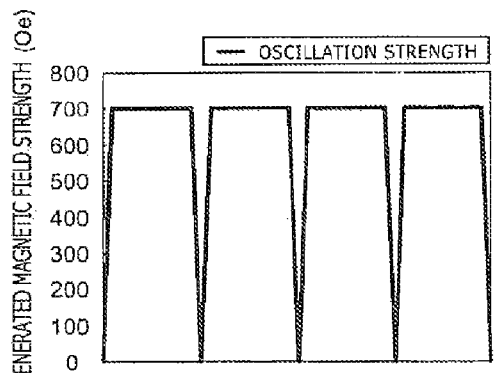

As shown in FIG. 4B, the magnetization direction of the spin injection layer 30 varies with the magnetic field from the main magnetic pole 61. Hence the spin injection layer 30 is magnetized at each writing time, avoiding demagnetization due to aging of the spin injection layer 30. Furthermore, the direction of the magnetic field applied by the main magnetic pole 61 to the spin torque oscillator 10, the magnetization direction of the oscillation layer 10a, and the magnetization direction of the spin injection layer 30 are parallel irrespective of the writing direction, and thus the oscillation condition does not depend on the writing direction.

It is noted that, by applying an external DC magnetic field having an appropriate strength (1 kOe to 10 kOe) perpendicular to the air bearing surface 100, the oscillation frequency and the oscillation strength of the spin torque oscillator 10 can be measured as a resistance change produced by the magnetoresistive effect of the spin torque oscillator 10. As a result, the time dependence of the oscillation frequency similar to FIG. 4C and the time dependence of the oscillation strength similar to FIG. 4D can be obtained.

Comparative Example

FIG. 5 shows graphs illustrating the write operation of a microwave assisted magnetic head according to a comparative example. More specifically, FIG. 5A shows the time dependence of the magnetic field applied by the main magnetic pole 61 to the spin torque oscillator 10, FIG. 5B shows the time dependence of the magnetization direction of the spin injection layer 30, FIG. 5C shows the time dependence of the oscillation frequency of the oscillation layer 10a of the spin torque oscillator 10, and FIG. 5D shows the time dependence of the generated magnetic field strength.

Figure 5A:
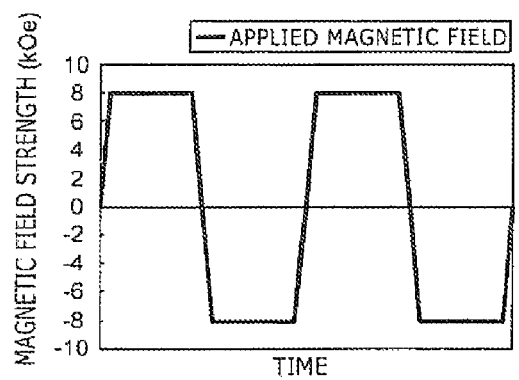
FIGS. 5A to 5D show graphs illustrating the write operation of a microwave assisted magnetic head according to a comparative example.
Figure 5C:
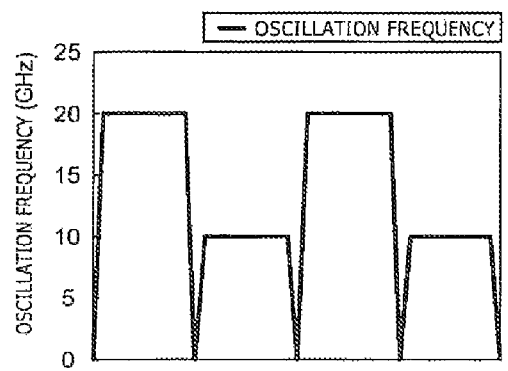
Figure 5B:
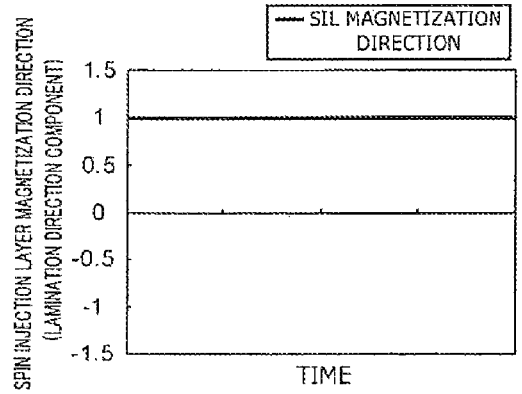
Figure 5D:
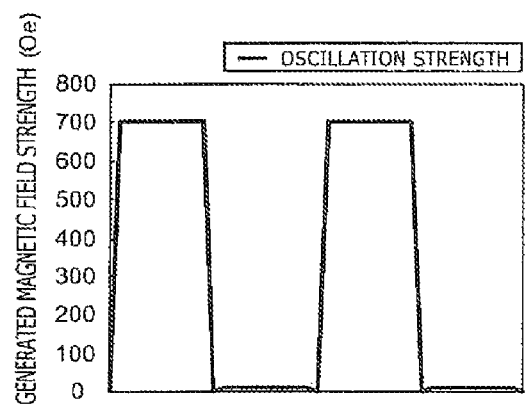

In this comparative example, as shown in FIG. 5B, the magnetization of the spin injection layer 30 is pinned irrespective of the writing direction. Hence the direction of the magnetic field applied by the main magnetic pole 61 to the spin torque oscillator 10, the magnetization direction of the oscillation layer 10a, and the magnetization direction of the spin injection layer 30 are parallel or antiparallel depending on the writing direction. As a result, as shown in FIGS. 5C and 5D, the oscillation frequency and the generated magnetic field strength of the spin torque oscillator 10 vary with the writing direction.

The reason for the above-mentioned oscillation of the spin torque oscillator 10 is described below in detail.

Figure 6:
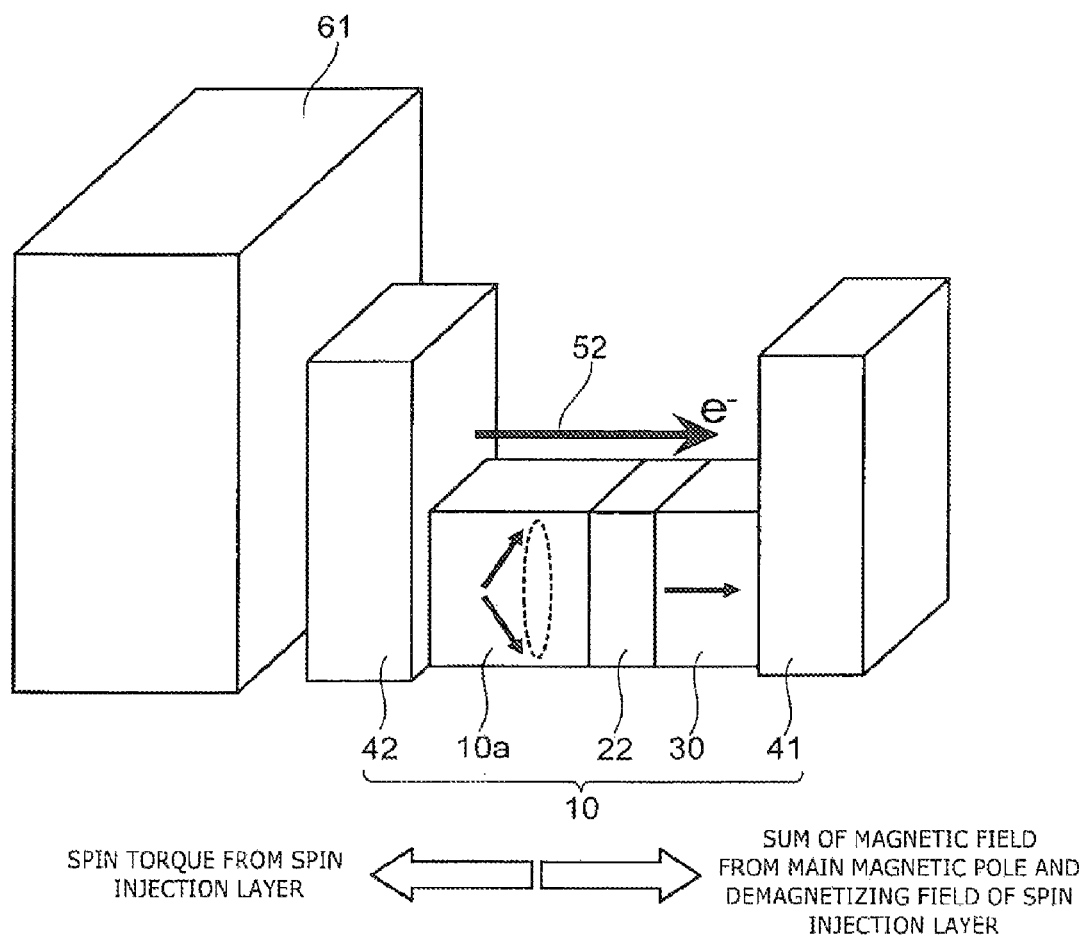
FIG. 6 is a conceptual view for illustrating the operation of the magnetic recording head of this embodiment.

FIG. 6 is a conceptual view for illustrating the operation of the magnetic recording head 5 of this embodiment.

More specifically, FIG. 6 shows the situation where a magnetic field is generated in the positive direction from the main magnetic pole 61 to the spin torque oscillator 10. The magnetic field from the main magnetic pole 61 is higher than the coercivity of the spin injection layer 30. Hence the spin injection layer 30 is magnetized in the positive direction. Consequently, the "sum of the magnetic field from the main magnetic pole 61 and the demagnetizing field of the spin injection layer 30" in the oscillation layer 10a is balanced with the spin torque from the spin injection layer 30 in the oscillation layer 10a, resulting in oscillation of the oscillation layer 10a. More specifically, among the electrons that have passed through the oscillation layer 10a from the main magnetic pole 61 side, the electrons with the same spin direction as the spin injection layer 30 pass through the spin injection layer 30, whereas the electrons with spin opposite to the spin injection layer 30 are reflected at the interface between the intermediate layer 22 and the spin injection layer 30. Thus the electrons with spin opposite to the spin injection layer 30 flow into the oscillation layer 10a. The spin angular momentum of these electrons is transferred to the magnetization of the oscillation layer 10a as a spin torque acting thereon, and the spin torque is directed opposite to the spin injection layer 30. Consequently, precession occurs in the oscillation layer 10a, and its magnetization oscillates.

Figure 7:
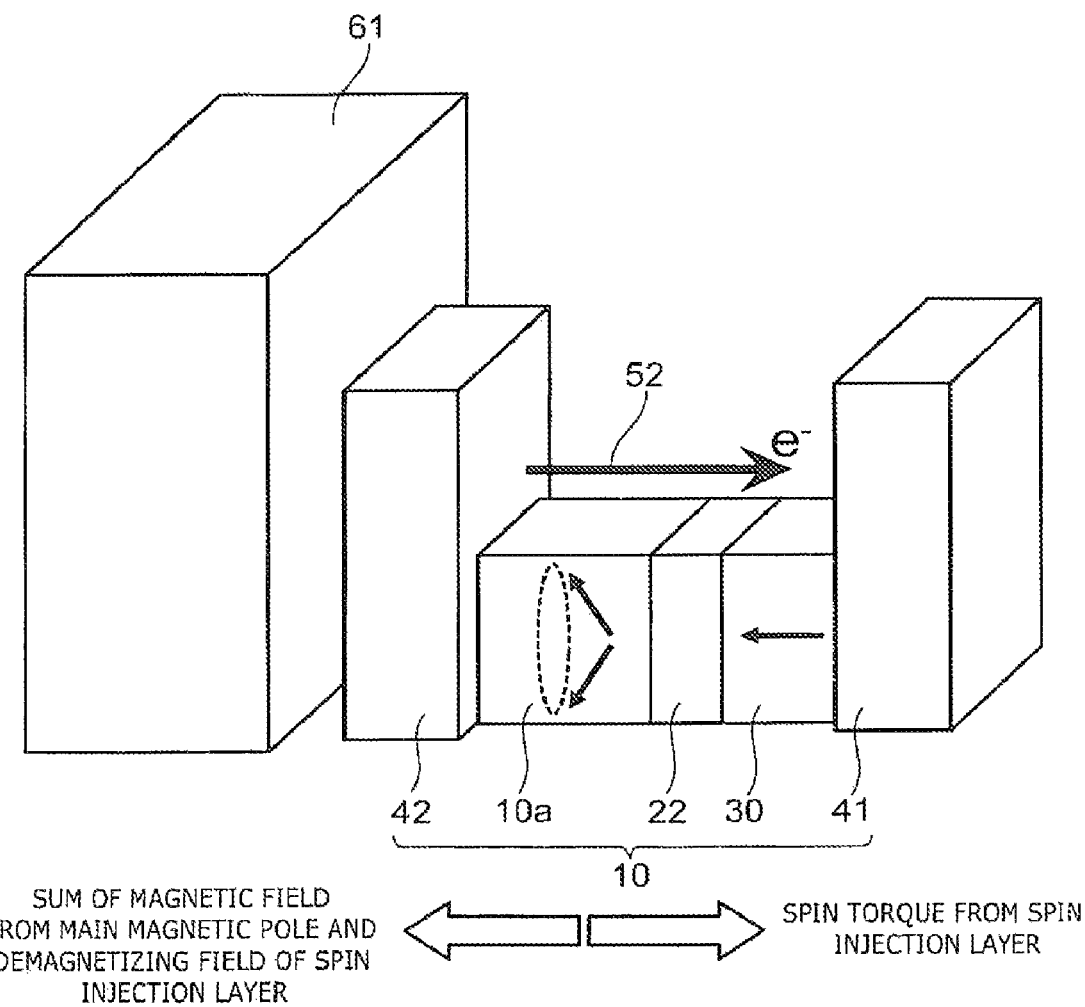
FIG. 7 is a conceptual view for illustrating the operation of the magnetic recording head of this embodiment.

FIG. 7 is a conceptual view for illustrating the operation of the magnetic recording head 5 of this embodiment.

More specifically, FIG. 7 shows the situation where a magnetic field is generated in the negative direction from the main magnetic pole 61. Also in this case, like FIG. 6, the magnetic field from the main magnetic pole 61 is higher than the coercivity of the spin injection layer 30. Hence the spin injection layer 30 is magnetized in the negative direction. Consequently, the "sum of the magnetic field from the main magnetic pole 61 and the demagnetizing field of the spin injection layer 30" in the oscillation layer 10a is balanced with the spin torque from the spin injection layer 30 in the oscillation layer 10a, resulting in oscillation of the oscillation layer 10a. Also in this case, like FIG. 6, the spin torque from the spin injection layer 30 acts on the oscillation layer 10a, and its magnetization oscillates.

As described above, according to this embodiment, because the magnetization direction of the spin injection layer 30 and the magnetization direction of the oscillation layer 10a are symmetric with respect to the direction of the magnetic field from the main magnetic pole 61, the oscillation frequency proportional to the magnetic field applied to the oscillation layer 10a, as well as the generated magnetic field, remains constant independent of the writing direction, achieving stable oscillation characteristics.

Furthermore, the spin injection layer 30 is magnetized at each writing time by the magnetic field from the main magnetic pole 61. This significantly decreases the demagnetization effect of the oscillation layer 10a due to aging and enables fabrication of a spin torque oscillator 10 exhibiting stable oscillation. Hence this embodiment can be used to provide a high-density magnetic recording apparatus having high reliability.

In this embodiment, a high-frequency magnetic field can be generated from the spin torque oscillator 10 by passing a driving electron flow 52 from the oscillation layer 10a side to the spin injection layer 30 side.

Figure 8:
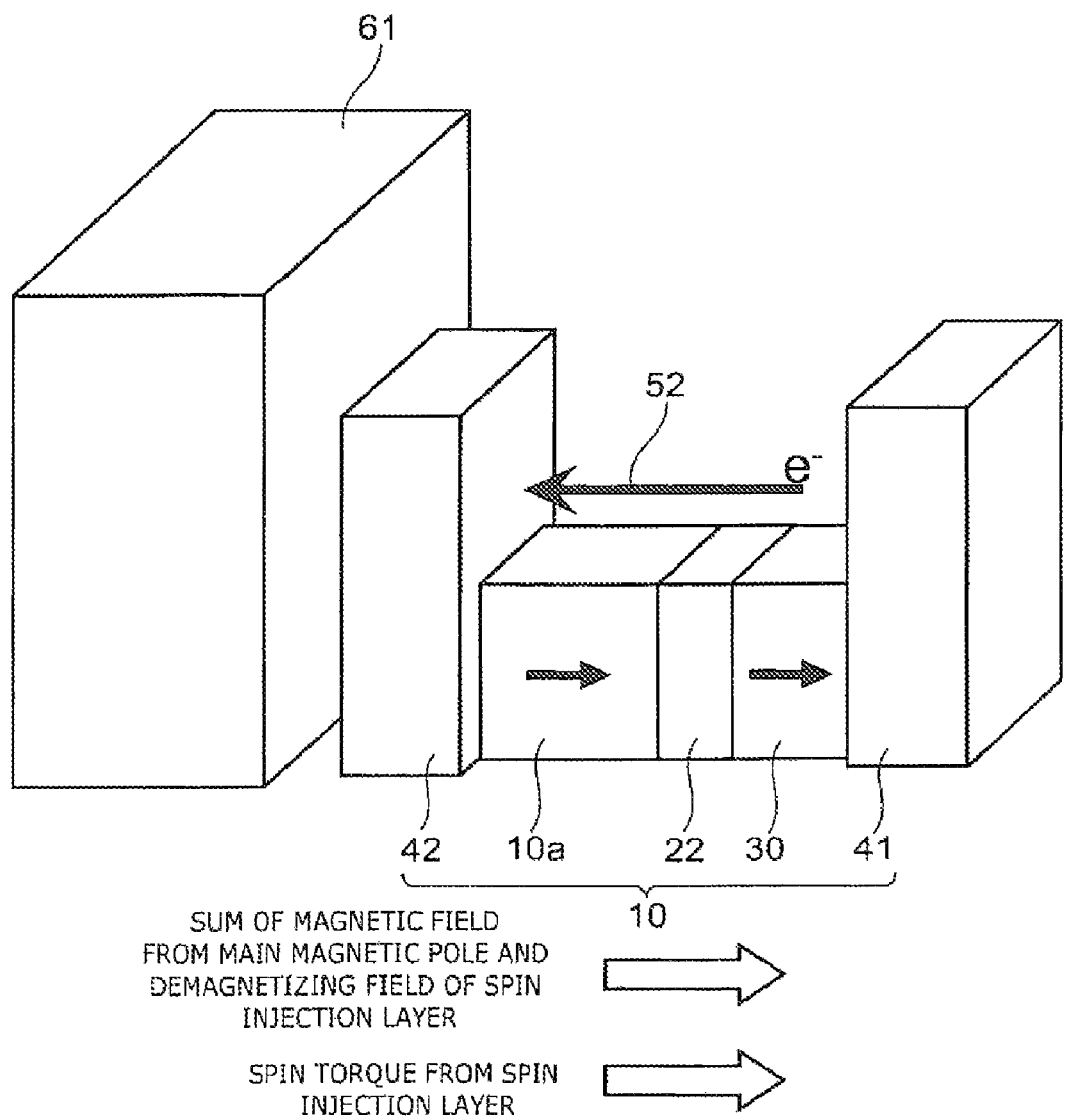
FIG. 8 is a conceptual view for illustrating the relationship between the current direction in the spin torque oscillator and the operation of the magnetic recording head.
Figure 9:
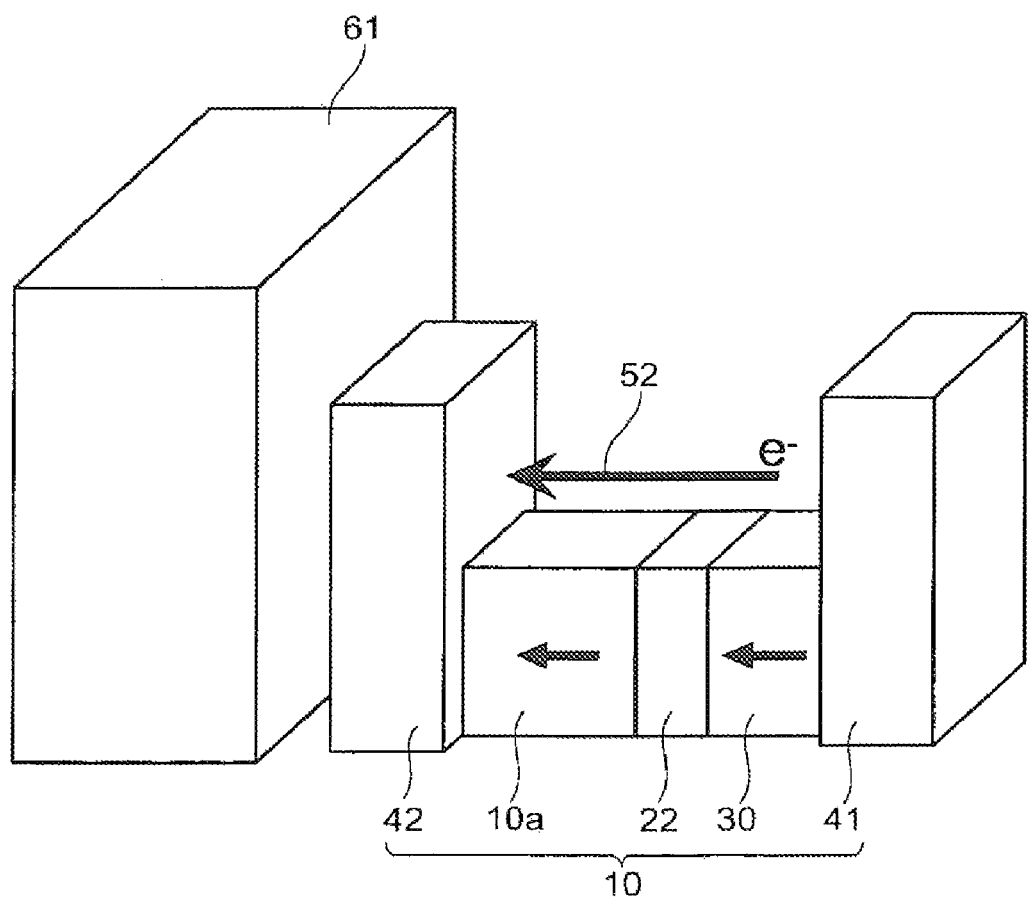
FIG. 9 is a conceptual view for illustrating the relationship between the current direction in the spin torque oscillator and the operation of the magnetic recording head.

FIGS. 8 and 9 are conceptual views for illustrating the operation of passing a driving electron flow 52 from the spin injection layer 30 side to the oscillation layer 10a side in the cases where the magnetic field from the main magnetic pole 61 to the spin torque oscillator 10 is in the positive and negative direction, respectively. In these cases, the direction of the spin torque from the spin injection layer 30 in the oscillation layer 10a is the same as the magnetization direction of the spin injection layer 30. The direction of the spin torque is parallel to, and not balanced with, the "sum of the magnetic field from the main magnetic pole 61 and the demagnetizing field of the spin injection layer 30". Thus the magnetization of the oscillation layer 10a does not undergo precession, and hence no oscillation occurs.

In magnetic recording to a medium 80 by the magnetic recording head 5, when the air bearing surface 100 of the magnetic recording head 5 is held with a prescribed floating amount from the magnetic recording layer 81 of the medium 80, the distance (magnetic spacing) between the air bearing surface 100 and the center of thickness of the magnetic recording layer 81 is kept at generally 10 nm, for example. The gap between the air bearing surface 100 and the surface of the magnetic recording layer 81 is generally 5 nm.

The spin torque oscillator 10 can be provided on either the trailing side or the leading side of the main magnetic pole 61. This is because the medium magnetization is not reversed by the recording magnetic field of the main magnetic pole 61 alone, but is reversed only in the region where the high-frequency magnetic field of the spin torque oscillator 10 is superposed on the recording magnetic field of the main magnetic pole 61.

The oscillation layer 10a may have a structure where the first magnetic layer, the intermediate layer, and the second magnetic layer are laminated in this order. In this case, the first magnetic layer and the second magnetic layer form antiferromagnetic coupling or static magnetic field coupling, and oscillation occurs with the magnetizations thereof remaining antiparallel. This enables a longitudinal magnetic field to be efficiently applied to the medium 80. The intermediate layer is preferably made of a noble metal such as Cu, Pt, Au, Ag, Pd, or Ru, and can be made of a nonmagnetic transition metal such as Cr, Rh, Mo, or W.

Second Embodiment

Next, a second embodiment of the invention is described.

Figure 10:
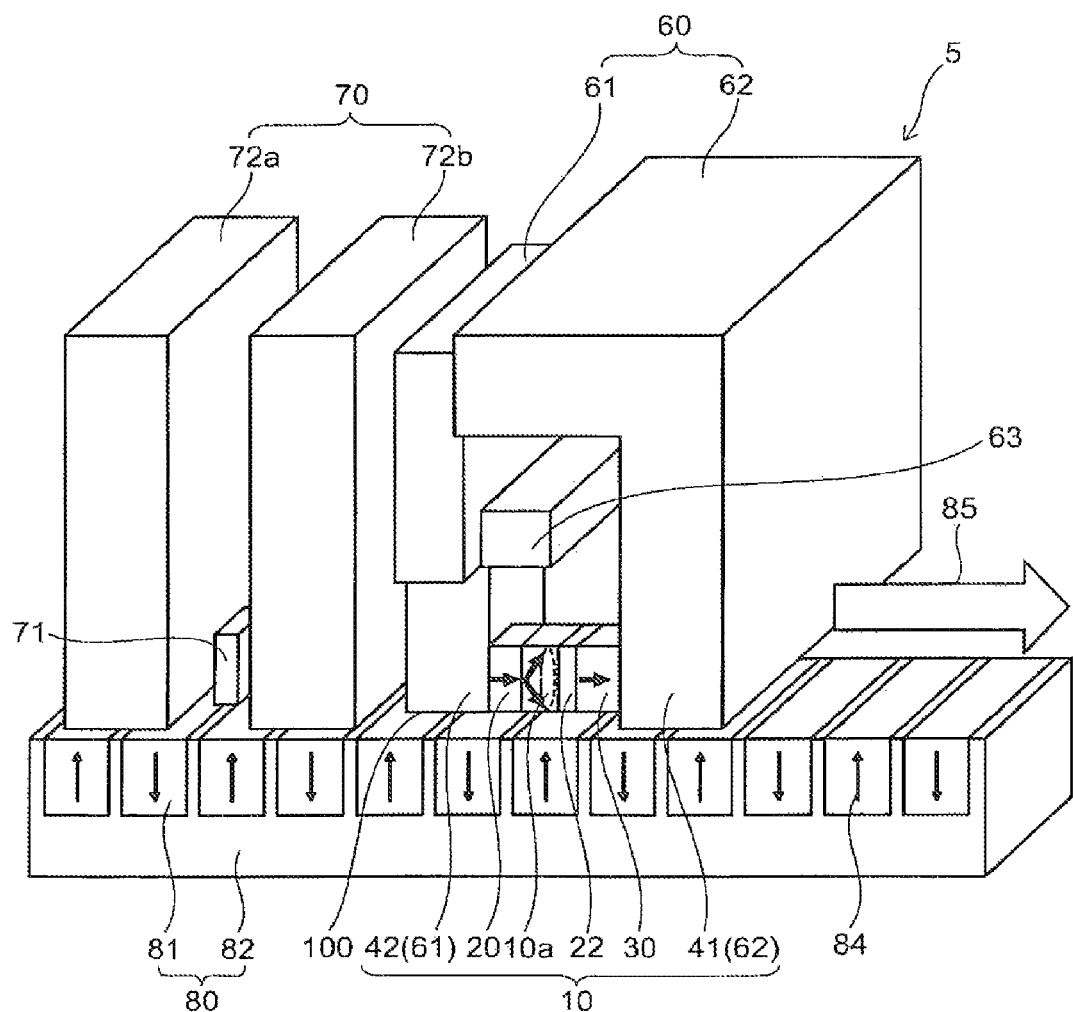
FIG. 10 is a perspective view showing the schematic configuration of a magnetic recording head according to a second embodiment of the invention.

FIG. 10 is a perspective view showing the schematic configuration of a magnetic recording head 5 provided with a spin torque oscillator 10 according to the second embodiment of the invention.

In this embodiment, a shield 62 is placed on the leading side of the main magnetic pole 61, and a laminated body of the spin torque oscillator 10 is placed between the main magnetic pole 61 and the shield 62. The surface of the main magnetic pole 61 and the shield 62 opposed to the laminated body is perpendicular to the lamination direction (thickness direction of the layer) of the laminated body. The spin injection layer 30 and the oscillation layer 10a are magnetized parallel to the lamination direction, i.e., in the direction from the main magnetic pole 61 to the shield 62 or in the opposite direction.

The oscillation layer 10a includes a high-Bs soft magnetic material (FeCo/NiFe laminated film) generating a magnetic field during oscillation. A bias layer 20 (fifth magnetic layer, in this case CoPt alloy layer) is provided between the main magnetic pole 61 and the oscillation layer 10a to bias the high-Bs soft magnetic material layer by exchange coupling force.

The thickness of the high-Bs soft magnetic material is preferably from 5 nm to 20 nm, and the thickness of the bias layer 20 is preferably from 10 nm to 60 nm. The spin injection layer 30 is made of a CoPt alloy with its magnetization oriented perpendicular to the film plane. The thickness of the spin injection layer 30 is preferably from 10 nm to 60 nm. The thickness of the high-Bs soft magnetic material, the thickness of the bias layer 20, and the thickness of the spin injection layer 30 are suitably adjusted so as to achieve a desired oscillation.

The main magnetic pole 61 and the shield 62 also serve as electrodes for injecting a driving electron flow 52 that drives the spin torque oscillator 10. As a matter of course, back gap portions of the main magnetic pole 61 and the shield 62 are electrically insulated each other. The driving current density is preferably from $5 \times 10^7$ A/cm$^2$ to $1 \times 10^9$ A/cm$^2$, and suitably adjusted so as to achieve a desired oscillation. In addition, in this embodiment, while the main magnetic pole 61 and the shield 62 are directly adjacent to the laminated body, a metal body may be inserted between the main magnetic pole 61 or the shield 62 and the laminated body so as to adjust the distance from the main magnetic pole 61 and the shield 62 to the laminated body.

More specifically, the laminated body further includes the bias layer 20 (fifth magnetic layer) provided between the electrode (in this case the main magnetic pole 61) at an opposite side of the oscillation layer 10a to the intermediate layer 22 of electrodes and the oscillation layer 10a, having a coercivity lower than the magnetic field applied by the main magnetic pole 61.

Next, the operation of the magnetic recording head 5 of this embodiment is described.

The coercivity of the bias layer 20 and the coercivity of the spin injection layer 30 are lower than the magnetic field from the main magnetic pole 61. Hence, at the time of write operation, the bias layer 20 and the spin injection layer 30 are magnetized in the same direction as the direction of the magnetic field from the main magnetic pole 61. Like the first embodiment, because the magnetization direction of the spin injection layer 30 and the magnetization direction of the oscillation layer 10a are symmetric with respect to the direction of the magnetic field from the main magnetic pole 61, the oscillation characteristics do not depend on the polarity of the magnetic field from the main magnetic pole 61. Thus the principle of oscillation is described illustratively in the case where the magnetic field from the main magnetic pole 61 is positive.

Figure 11:
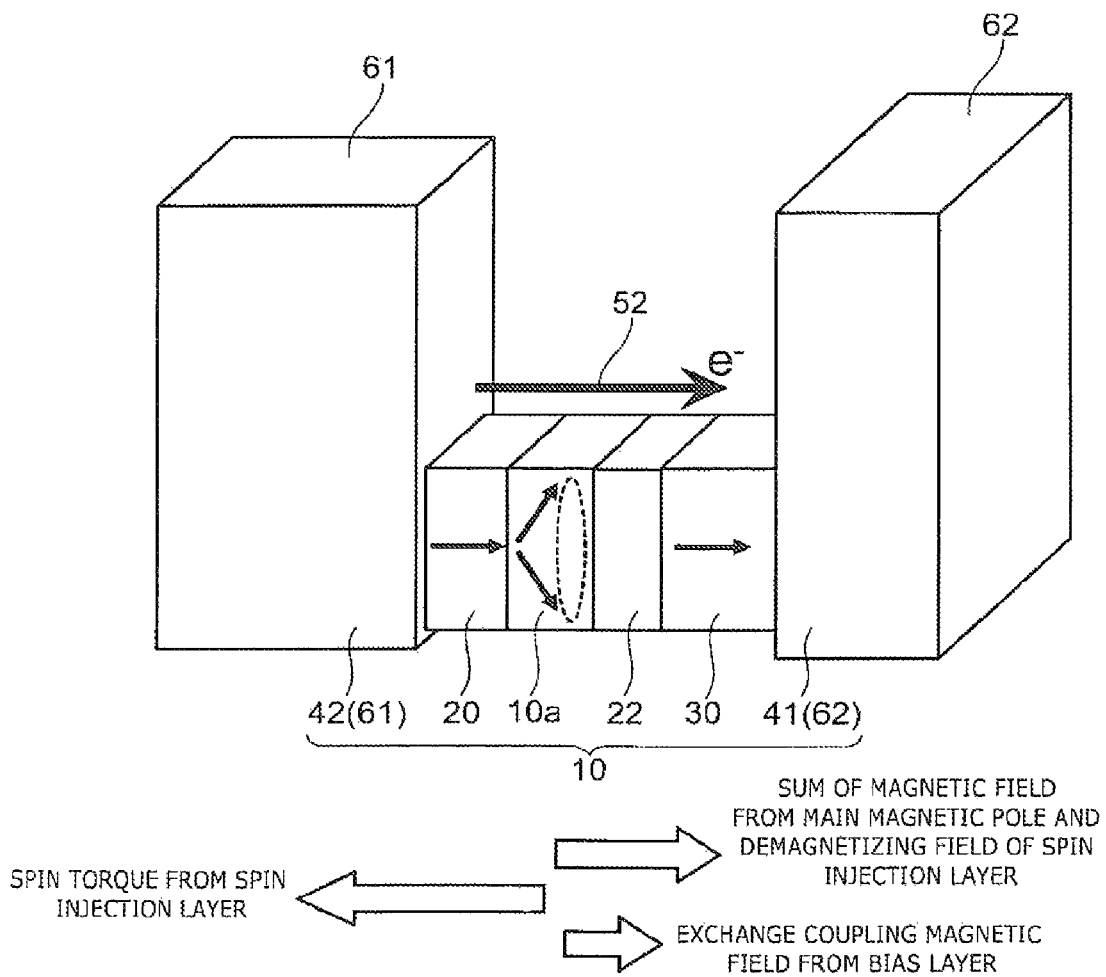
FIG. 11 is a conceptual view for illustrating the operation of the magnetic recording head of the second embodiment.

FIG. 11 is a conceptual view for illustrating the operation in the case where a magnetic field is generated in the positive direction from the main magnetic pole 61.

By the magnetic field from the main magnetic pole 61, the spin injection layer 30 and the bias layer 20 are magnetized in the positive direction. The magnetic field applied to the oscillation layer 10a is composed of the "sum of the magnetic field from the main magnetic pole 61 and the demagnetizing field of the spin injection layer 30" and the "exchange coupling magnetic field from the bias layer 20". The total of these magnetic fields is balanced with the spin torque from the spin injection layer 30, resulting in oscillation of the oscillation layer 10a.

More specifically, among the electrons that have passed through the oscillation layer 10a from the main magnetic pole 61 side, the electrons having the same spin direction as the spin injection layer 30 pass through the spin injection layer 30, whereas the electrons with spin opposite to the spin injection layer 30 are reflected at the interface between the intermediate layer 22 and the spin injection layer 30. Thus a spin torque from the spin injection layer 30 acts on the oscillation layer 10a, where precession occurs and its magnetization oscillates.

Furthermore, also in this embodiment, the spin injection layer 30 and the bias layer 20 are magnetized at each writing time by the magnetic field from the main magnetic pole 61. This significantly decreases the demagnetization effect of the oscillation layer 10a due to aging and enables fabrication of a spin torque oscillator 10 exhibiting stable oscillation. Hence this embodiment can be used to provide a high-density magnetic recording apparatus having high reliability.

FIG. 12 shows graphs illustrating the write operation of the magnetic recording head 5 provided with the spin torque oscillator 10 shown in FIG. 11. More specifically, FIG. 12A shows the time dependence of the magnetic field applied by the main magnetic pole 61 to the spin torque oscillator 10, FIG. 12B shows the time dependence of the magnetization direction of the spin injection layer 30, FIG. 12C shows the time dependence of the oscillation frequency of the oscillation layer 10a of the spin torque oscillator 10, and FIG. 12D shows the time dependence of the generated magnetic field strength.

Figure 12A:
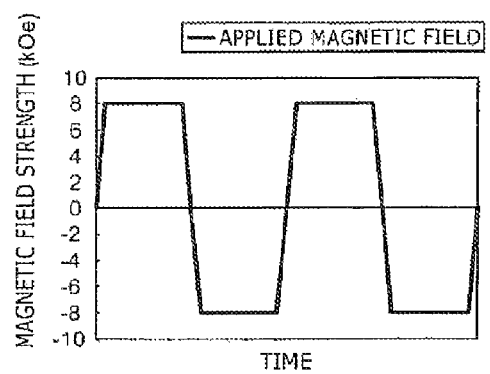
FIGS. 12A to 12D show graphs illustrating the write operation of the magnetic recording head provided with the spin torque oscillator 10 shown in FIG. 11.
Figure 12C:
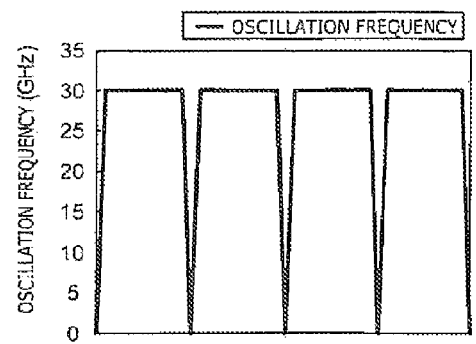
Figure 12B:
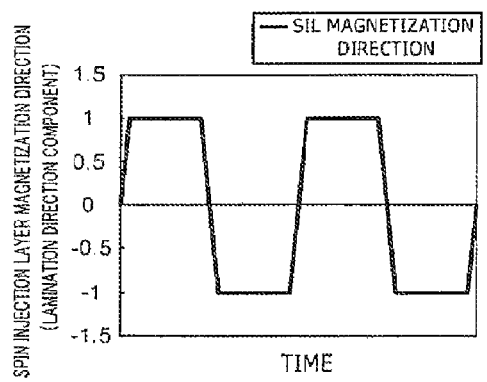
Figure 12D:
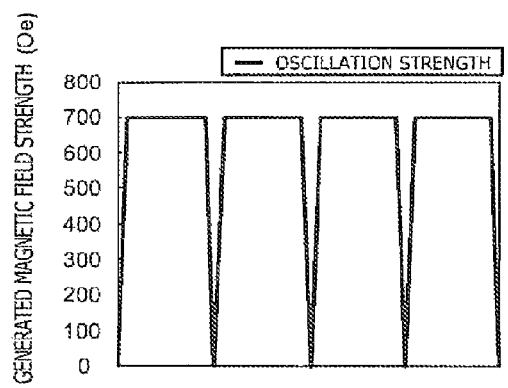

The oscillation frequency is proportional to the strength of the magnetic field applied to the oscillation layer 10a. Hence, by providing the oscillation layer 10a with a bias layer 20, the oscillation layer 10a can be operated at a higher frequency. As shown in FIG. 12C, the oscillation frequency of the spin torque oscillator 10 reaches 30 GHz.

To achieve ultrahigh-density recording, it is essential to prevent thermal fluctuations of the medium. This requires the enhancement of the medium coercivity (Hc), which simultaneously results in increasing the resonance frequency of the medium and increasing the oscillation frequency required for the spin torque oscillator 10. In contrast, combination with the spin torque oscillator 10 having a structure as shown in FIG. 11 enables writing also to a high-Hc medium capable of ultrahigh-density recording.

It is noted that, to optimize the oscillation frequency, a nonmagnetic layer may be interposed between the bias layer 20 and the oscillation layer 10a. The nonmagnetic layer is preferably made of a noble metal such as Cu, Pt, Au, Ag, Pd, or Ru, or can be made of a nonmagnetic transition metal such as Cr, Rh, Mo, or W.

Furthermore, the materials and the lamination films thereof described above with reference to the first embodiment can be also used for the spin injection layer 30 and the oscillation layer 10a to achieve a similar effect.

Third Embodiment

Next, a third embodiment of the invention is described.

Figure 13:
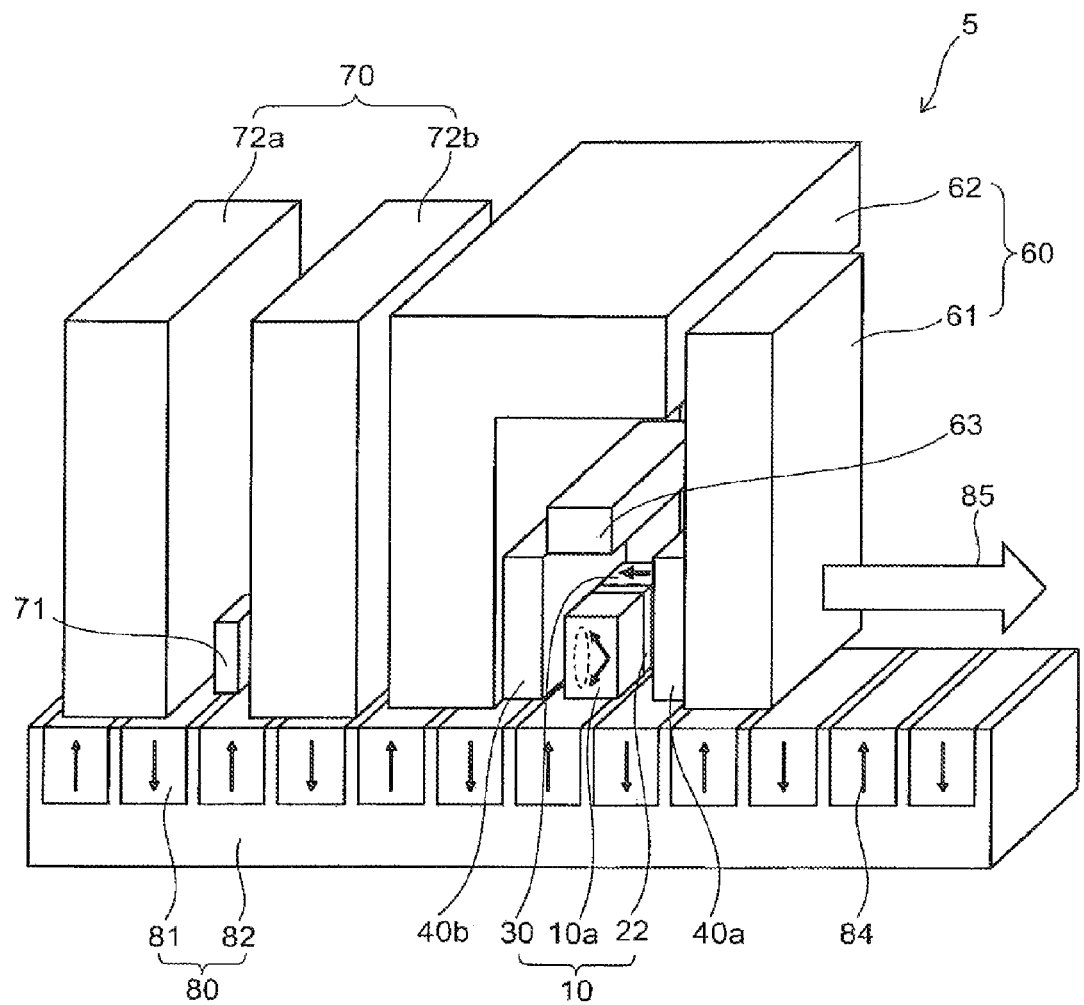
FIG. 13 is a perspective view showing the schematic configuration of a magnetic recording head according to a third embodiment of the invention.

FIG. 13 is a perspective view showing the schematic configuration of a magnetic recording head 5 provided with a spin torque oscillator 10 according to the third embodiment of the invention.

In this embodiment, a shield 62 is placed on the trailing side of the main magnetic pole 61, and the spin torque oscillator 10 is provided between the main magnetic pole 61 and the shield 62. The surface of the main magnetic pole 61 and the shield 62 opposed to the laminated body is parallel to the lamination direction (thickness direction of the layer) of the spin torque oscillator 10. The spin injection layer 30 and the oscillation layer 10a are magnetized perpendicular to the lamination direction, i.e., in the direction from the main magnetic pole 61 to the shield 62 or in the opposite direction. Although the electrodes of the spin torque oscillator 10 are not shown in FIG. 13, electrodes capable of passing a current parallel to the lamination direction of the spin injection layer 30, the intermediate layer 22, and the oscillation layer 10a are connected to the spin torque oscillator 10. Furthermore, the spin torque oscillator 10 is insulated from the main magnetic pole 61 and the shield 62. Hence, at the time of write operation, the effect of eddy current generated from the main magnetic pole 61 can be prevented. The lamination direction of the spin torque oscillator 10 is perpendicular to the medium moving direction 85 in the example shown in FIG. 13, however, the invention is not limited to this specific example. The lamination direction of the spin torque oscillator 10 can be parallel to the medium moving direction 85.

A magnetic flux focusing layer 40a (third magnetic layer) is provided between the spin torque oscillator 10 and the main magnetic pole 61. The magnetic flux focusing layer 40a can be made of a soft magnetic material such as CoFe, CoNiFe, NiFe, CoZrNb, FeN, FeSi, or FeAlSi having a relatively high saturation magnetic flux density and having magnetic anisotropy in a direction longitudinal to the film plane. Furthermore, a magnetic flux focusing layer 40b (fourth magnetic layer) is provided between the spin torque oscillator 10 and the shield 62. The magnetic flux focusing layer 40b can be made of a soft magnetic material such as CoFe, CoNiFe, NiFe, CoZrNb, FeN, FeSi, or FeAlSi having a relatively high saturation magnetic flux density and having magnetic anisotropy in a direction longitudinal to the film plane.

With the increase of frequency, the distance from the magnetic recording medium 80 to the main magnetic pole 61 and the shield 62 decreases. Hence the magnetic field generated from the main magnetic pole 61 tends to be directed toward the magnetic recording medium 80. Thus the magnetic flux focusing layers 40a and 40b, being soft magnetic, are provided to focus the magnetic field from the main magnetic pole 61 on the spin torque oscillator 10. The magnetic flux focusing layers 40a and 40b serve to guide the magnetic field generated from the main magnetic pole 61 toward the spin torque oscillator 10.

Let Bsa and Bsb be the saturation magnetic flux density in the magnetic flux focusing layers 40a and 40b, and Ωa and Ωb the solid angle of the magnetic flux focusing layers 40a and 40b subtended by the spin torque oscillator 10. When the magnetic flux focusing layers are saturated, the magnetic field applied to the spin torque oscillator 10 is given by:

$$H = Bsa \times \Omega a + Bsb \times \Omega b \qquad (1)$$

Hence, to efficiently apply a magnetic field to the spin torque oscillator 10, it is preferable to increase the saturation magnetization (Ms) of the magnetic flux focusing layers as much as possible. In addition, the solid angle Ω of the magnetic flux focusing layer may be increased by narrowing the distance between the main magnetic pole 61 and the shield 62 and/or increasing the dimensions of the magnetic flux focusing layers 40a and 40b.

Furthermore, to efficiently focus the magnetic flux on the spin torque oscillator 10, the main magnetic pole 61 may be laminated with the magnetic flux focusing layer 40a, and/or the shield 62 may be laminated with the magnetic flux focusing layer 40b. On the other hand, to efficiently apply the magnetic field from the main magnetic pole 61 to the medium, a nonmagnetic material, i.e., a nonmagnetic metal or an insulator, may be laminated between the main magnetic pole 61 and the magnetic flux focusing layer 40a, or between the shield 62 and the magnetic flux focusing layer 40b.

Next, the operation of the magnetic recording head 5 according to this embodiment is described.

The coercivity of the spin injection layer 30 is lower than the magnetic field from the main magnetic pole 61. Hence, at the time of write operation, the spin injection layer 30 is magnetized in the same direction as the direction of the magnetic field from the main magnetic pole 61. Like the first embodiment, because the magnetization direction of the spin injection layer 30 and the magnetization direction of the oscillation layer 10a are symmetric with respect to the direction of the magnetic field from the main magnetic pole 61, the oscillation characteristics do not depend on the polarity of the magnetic field from the main magnetic pole 61. Thus the principle of oscillation is described illustratively in the case where the magnetic field from the main magnetic pole 61 is positive.

Figure 14:
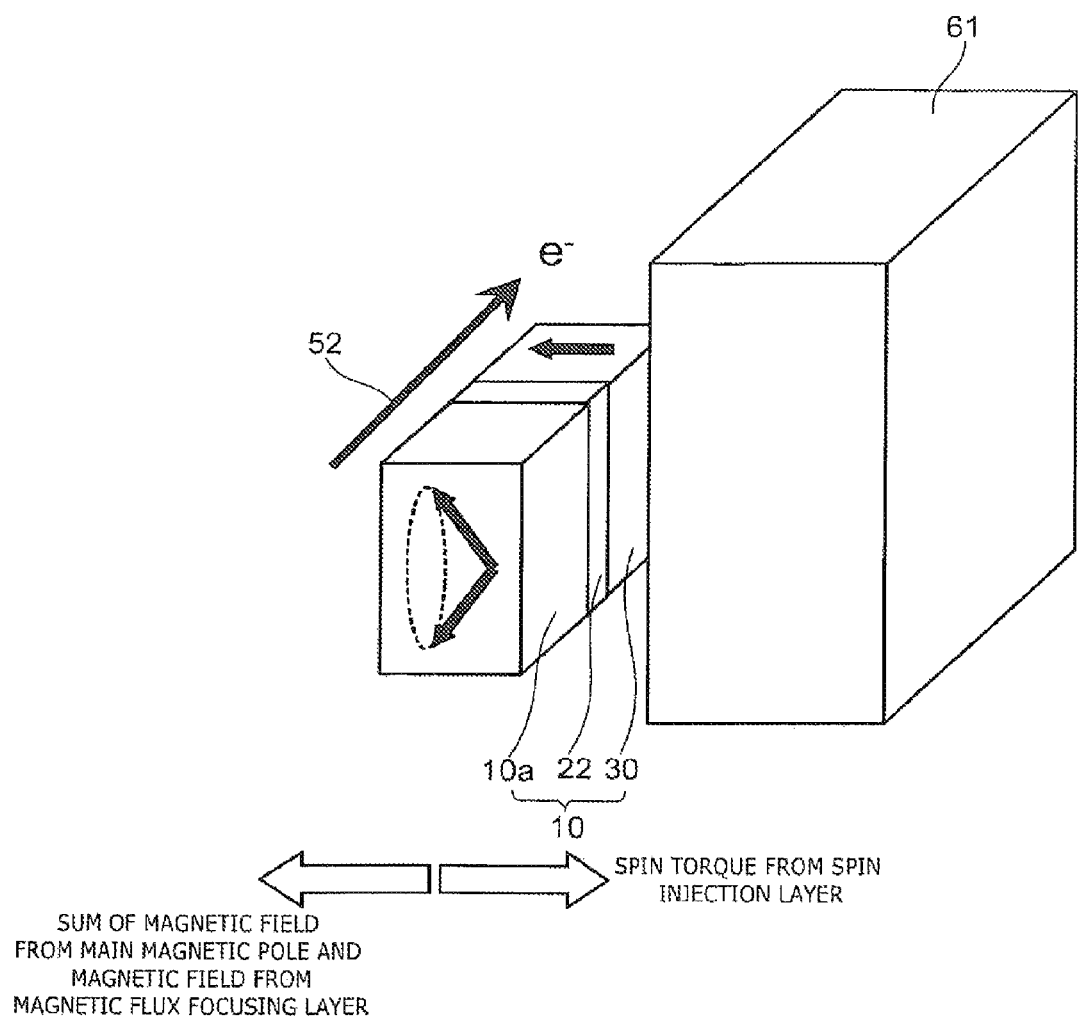
FIG. 14 is a conceptual view for illustrating the operation of the magnetic recording head of the third embodiment.

FIG. 14 is a conceptual view for illustrating the operation in the case where a magnetic field is generated in the positive direction from the main magnetic pole 61 toward the spin torque oscillator 10.

By the magnetic field from the main magnetic pole 61, the spin injection layer 30 is magnetized in the positive direction. The magnetic field applied to the oscillation layer 10a is composed of the "sum of the magnetic field from the main magnetic pole 61 and the magnetic field from the magnetic flux focusing layer". This magnetic field is balanced with the spin torque from the spin injection layer 30, resulting in oscillation of the oscillation layer 10a.

More specifically, among the electrons that have passed through the oscillation layer 10a, the electrons having the same spin direction as the spin injection layer 30 pass through the spin injection layer 30, whereas the electrons with spin opposite to the spin injection layer 30 are reflected at the interface between the intermediate layer 22 and the spin injection layer 30. Thus a spin torque from the spin injection layer 30 acts on the oscillation layer 10a, where precession occurs, resulting in oscillation.

Furthermore, the spin injection layer 30 is magnetized at each writing time by the magnetic field from the main magnetic pole 61. This significantly decreases the demagnetization effect of the oscillation layer 10a due to aging and enables fabrication of a spin torque oscillator 10 exhibiting stable oscillation. Hence this embodiment can be used to provide a high-density magnetic recording apparatus having high reliability.

Furthermore, to achieve stable oscillation, the oscillation layer 10a preferably has equal dimensions in the direction perpendicular to the air bearing surface (ABS) 100 and in its lamination direction.

To obtain a suitable oscillation frequency, the oscillation layer 10a may be made of the materials and the laminated films thereof described in the first embodiment. To adapt the coercivity of the spin injection layer 30 to the strength of the magnetic field from the main magnetic pole 61, the spin injection layer 30 may be made of the materials and the laminated films thereof described in the first embodiment.

To increase the frequency, a bias layer 20 may be provided adjacent to the oscillation layer 10a as in the second embodiment of the invention.

The remaining head configuration, the operating principle, and the effect in this embodiment are the same as those described in the first embodiment.

Each magnetic layer of the spin torque oscillator 10 may have an easy magnetization axis in the lamination direction in the case of FIG. 10 and in the in-plane direction in the case of FIG. 13. The easy axis can be fixed by growing a crystal so that, for a CoPt-based material, for example, the c-axis is directed along the easy axis.

Fourth Embodiment

Next, a fourth embodiment of the invention is described.

Figure 15:
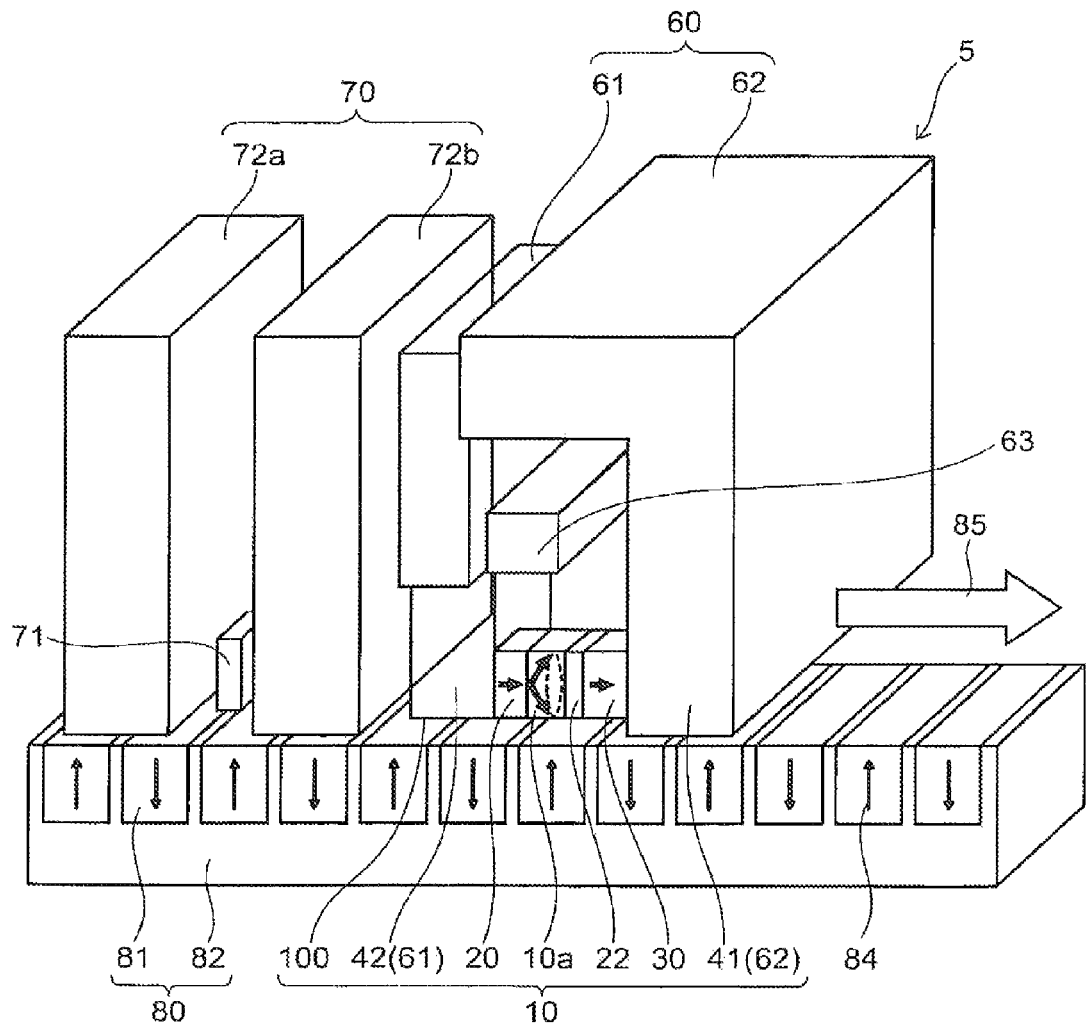
FIG. 15 is a perspective view showing the schematic configuration of a magnetic recording head according to a fourth embodiment of the invention.

FIG. 15 is a perspective view showing the schematic configuration of a magnetic recording head 5 according to the fourth embodiment of the invention.

As shown in FIG. 15, the magnetic recording head 5 according to the fourth embodiment of the invention is provided with the shield 62 placed on the trailing side of the main magnetic pole 61, and the laminated body of the spin torque oscillator 10 is provided between the main magnetic pole 61 and the shield 62. The direction from the main magnetic pole 61 to the shield 62 is substantially parallel to the lamination direction (thickness direction of the layer) of the spin torque oscillator 10. The spin injection layer 30 and the oscillation layer 10a are magnetized substantially parallel to the lamination direction, i.e., in the direction from the main magnetic pole 61 to the shield 62 or in the opposite direction.

It is noted that, in the magnetic recording head 5 according to this embodiment, the shield 62 serves as the electrode 41 on the spin injection layer 30 side and the main magnetic pole 61 serves as the electrode 42 on the oscillation layer 10a side. That is to say, a pair of electrodes are illustratively the main magnetic pole 61 and the shield 62. As a matter of course, back gap portions of the main magnetic pole 61 and the shield 62 are electrically insulated each other. In addition, in this embodiment, while the main magnetic pole 61 and the shield 62 are directly adjacent to the laminated body, a metal body may be inserted between the main magnetic pole 61 or the shield 62 and the laminated body so as to adjust the distance from the main magnetic pole 61 and the shield 62 to the laminated body.

The oscillation layer 10a can be made of, for example, a laminated body of CoFe with a thickness of 10 Å and NiFe with a thickness of 60 Å. The intermediate layer 22 can be based on, for example, Cu with a thickness of 20 Å. Furthermore, the injection layer 30 and the bias layer 20 can be made of, for example, a CoCr alloy with a thickness of 400 Å added with Os of 5 at %.

It is noted that the oscillation layer 10a and the intermediate layer 22 can be made of materials described with reference to the first embodiment and materials having a laminated structure.

Furthermore, the spin injection layer 30 and the bias layer 20 may be illustratively made of a Co-based hard magnetic alloy such as a CoPt alloy or the like other than a CoCr alloy. More specifically, the spin injection layer 30 and the bias layer 20 can be made of a variety of materials having magnetization in a perpendicular direction. Furthermore, an additional element for a variety of materials having the magnetization in the perpendicular direction such as a Co-based hard magnetic alloy or the like may be made of an element such as Ru, W, Re, Ir, Sm, Eu, Tb, Gd, Dy, Ho, Rh, Pd other than Os. More specifically, at least any of the spin injection layer 30 and the bias layer 20 can contain at least one selected from a group comprising of Ru, W, Re, Os, Ir, Sm, Eu, Tb, Gd, Dy, Ho, Rh and Pd.

These elements strengthen s-d interaction or spin-orbit interaction, therefore a damping constant can be increased from normal 0.02 to 0.05~0.5.

Figure 16:
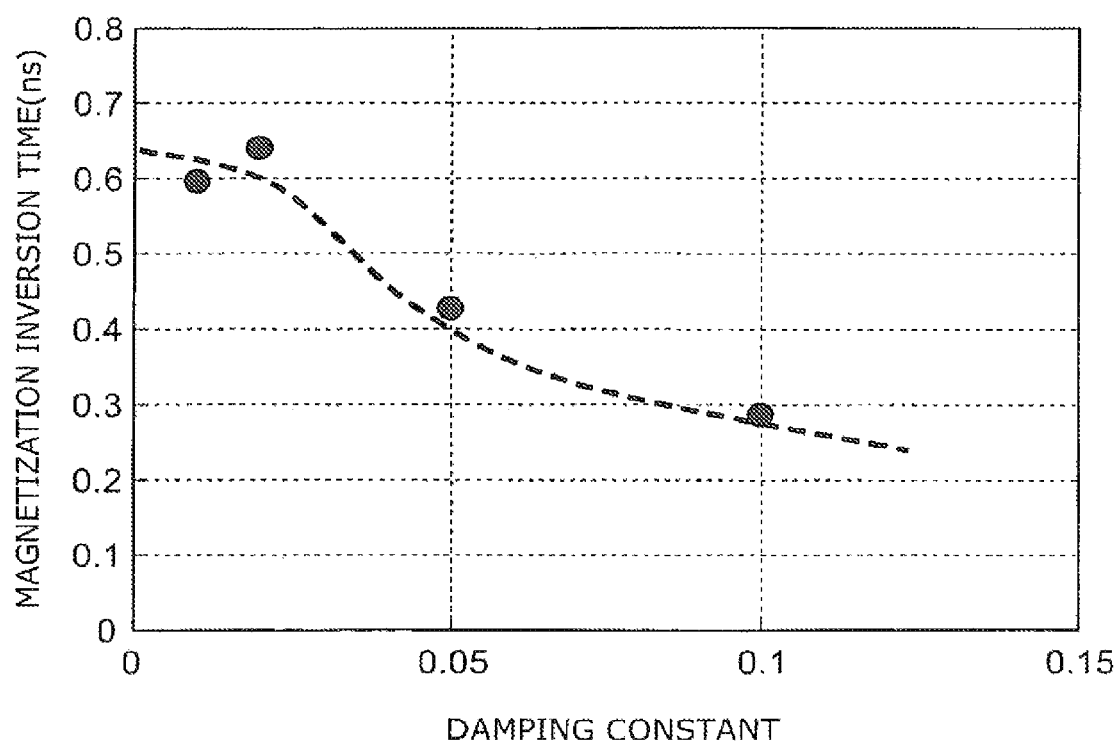
FIG. 16 is a graph illustrating the relationship between a magnetization inversion time and a damping constant.

FIG. 16 is a graph illustrating the relation between a magnetization inversion time and a damping constant in a magnetic recording head according to the fourth embodiment of the invention.

More specifically, FIG. 16 shows the relation between the magnetization inversion time of the spin injection layer 30 or the bias layer 20 and the damping constant, when the direction of the magnetic field from the main magnetic pole 61 to the spin torque oscillator 10 changes from the positive direction to the negative direction.

The magnetization inversion time refers to time for the inversion of the magnetization of the spin injection layer 30 from the positive direction to the negative direction, when the applied magnetic field from the main magnetic pole 61 to the spin injection layer 30 inverts instantaneously from +5 kOe to −60 kOe.

The normal damping constant of the spin injection layer 30 or the bias layer 20 is about 0.02, and the magnetization inversion time is 0.64 ns as shown in FIG. 16. On the other hand, the time for the inversion of the magnetic field from the main magnetic pole 61 from the positive direction to the negative direction is 0.3 ns. That is, the magnetization inversion time in this case is about two times of the time for the inversion of the magnetic field, thus at the inversion of the magnetic field from the main magnetic pole 61, the magnetization inversion of the spin injection layer 30 and the bias layer 20 lags behind to cause the oscillation to be unstable. As a result, recording of 0/1 on the medium in a magnetization inversion region, particularly satisfactory characteristics of overwriting is difficult to be realized.

On the other hand, in the magnetic recording head 5 according to this embodiment, the damping constant of the spin injection layer 30 and the bias layer 20 is 0.1, and as shown in FIG. 16, the magnetization inversion time is to be 0.29 ns. The time for inverting the magnetic field from the magnetic main pole 61 from the positive direction to the negative direction is 0.3 ns, and is substantially equivalent to the magnetization inversion time. Therefore, the magnetization of the spin injection layer 30 and the bias layer 20 inverts at the substantially same speed as the inversion speed of the magnetic field from the main magnetic pole 61. As a result, the magnetic recording head 5 according to this embodiment enables break of radio frequency magnetic field generation to minimize at inversion of the magnetic field from the magnetic main pole 61, allowing a stable magnetic recording.

Furthermore, the increase of the damping constant of the spin injection layer 30 and the bias layer 20 allows magnetic recording to medium to be performed more effectively through improvement of oscillation efficiency of the oscillation layer 10a. This will now be described.

The critical driving current density Jc at which the magnetic layer starts to oscillate by spin torque can be expressed by a following formula:

$$J_c = (H_{ext} + Hk - BsNd)\frac{\alpha e Ms \delta}{p_o \hbar} \qquad (2)$$

where Hext is the sum of exchange coupling magnetic field from the external magnetic field and the adjacent magnetic material, Hk is the anisotropic magnetic field, Bs is the saturated magnetic flux density (that is, 4 nMs), Nd is the demagnetization field constant, α is the damping constant, e is the elementary electric charge, δ is the film thickness, po is the porality, and h is the Planck constant.

Since the critical driving current density Jc is proportional to the damping constant as shown in formulae 2, the critical driving current density Jc of the spin injection layer 30 increases due to the increase of the damping constant of the spin injection layer 30 and the spin injection layer 30 becomes to be hard to rotate. As a result, effective injection of the energy of spin torque to the oscillation layer 10a becomes possible. Furthermore, the driving current density and Msδ of the oscillation layer 10a may be increased in proportion to the increase of the critical driving current density Jc of the spin injection layer 30. At this time, since the Msδ of the oscillation layer 10a is proportiona to the radio frequency magnetic field strength, the radio frequency magnetic field strength to the medium increases. The radio frequency magnetic field strength needs about 10% of Hk of the medium, the increase of the radio frequency magnetic field strength allows higher Hk medium, that is, higher Ku medium to be recorded, and further higher density recording can be achieved.

Furthermore, since the oscillation layer 10a and the bias layer 20 are directly laminated, a part of magnetization at the interface of the bias layer 20 oscillates under influence of the oscillation of the oscillation layer 10a via the exchange coupling force and the substantial exchange coupling magnetic field from the bias layer 20 to the oscillation layer 10a. Here, by increasing the damping constant of the bias layer 20, oscillation becomes to be hard at the interface of the bias layer 20, and the exchange coupling magnetic field from the bias layer 20 to the oscillation layer 10a allowed to be substantially increased. As the exchange coupling magnetic field increases, the oscillation frequency also increases. Furthermore, in microwave assisted magnetic recording, it is necessary to coincide the oscillation frequency with the resonance frequency of the medium. Since the resonant frequency of magnetic material is proportional to the anisotropic magnetic field (Hk) strength, the increase of the oscillation frequency of the oscillation layer 10a allows a higher Hk medium, that is, a high Ku medium to be used. As a result, further high density recording can be achieved.

It is noted that for optimizing the oscillation characteristics and the critical driving current density Jc of the bias layer 20 and the spin injection layer 30, additive elements (Ru, W, Re, Os, Ir, Sm, Eu, Tb, Gd, Dy, Ho, Rh, Pd or the like) to the bias layer 20 and the spin injection layer 30 and the amount of additive may be different, respectively.

Fifth Embodiment

Next, a fifth embodiment of the invention will be described.

Figure 17:
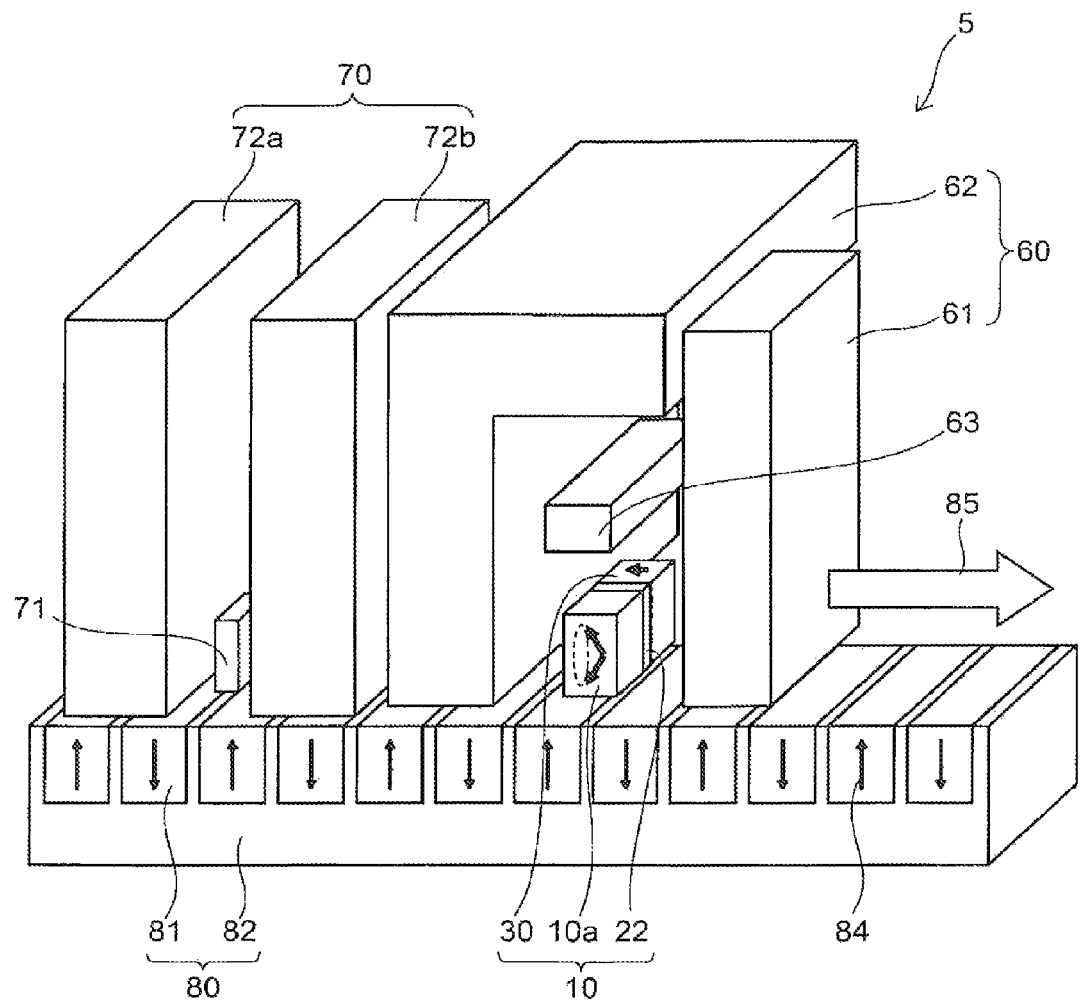
FIG. 17 is a perspective view showing the schematic configuration of a magnetic recording head according to a fifth embodiment of the invention.

FIG. 17 is a perspective view illustrating the schematic configuration of a magnetic recording head 5 according to the fifth embodiment of the invention.

As shown in FIG. 17, the magnetic recording head 5 according to the fifth embodiment of the invention is provided with the shield 62 placed on the trailing side of the main magnetic pole 61, and the spin torque oscillator 10 is provided between the main magnetic pole 61 and the shield 62. The direction from the main magnetic pole 61 to the shield 62 is substantially perpendicular to the lamination direction (thickness direction of the layer) of the spin torque oscillator 10. The spin injection layer 30 and the oscillation layer 10a are magnetized substantially perpendicular to the lamination direction, i.e., in the direction from the main magnetic pole 61 to the shield 62 or in the opposite direction.

It is noted that the electrode 41 on the spin injection layer 30 side and the electrode 42 on the oscillation layer 10a side are abbreviated.

The oscillation layer 10a can be made of, for example, a laminated body of CoFe with a thickness of 10 Å and NiFe with a thickness of 60 Å. The intermediate layer 22 can be based on, for example, Cu with a thickness of 20 Å. Furthermore, the injection layer 30 can be made of, for example, a CoCr alloy with a thickness of 400 Å. The electrode 41 adjacent to the spin injection layer 30 can be made of, for example, a laminated body of Pt with a thickness of 40 Å and Ru with a thickness of 40 Å.

The electrode 41 adjacent to the spin injection layer 30 may be made of a material containing at least one selected from a group comprising of Ru, Rh, Pd, Ir and Pt having a short spin scattering distance. Furthermore, the electrode 41 may be made of a material containing an alloy comprising of at least two selected from a group comprising of Ru, Rh, Ir and Pt.

The electrode 41 may be made of a laminated film of a layer containing at least one selected from a group comprising of Cu, Au, Ag and Al having a long spin scattering distance and a layer containing at least one elected from a group comprising of Ru, Rh, Pd, Ir, Pt having a short spin scattering distance.

Furthermore, the electrode 41 may be made of a laminated film of a layer containing at least one selected from a group comprising of Cu, Au, Ag and Al having a long spin scattering distance, and an alloy containing at least two selected from a group comprising of Ru, Rh, Pd, Ir, Pt having a short spin scattering distance.

Furthermore, the electrode 41 may be made of a laminated film of an alloy containing at least two selected from a group comprising of Cu, Au, Ag and Al having a long spin scattering distance, and a film containing at least one selected from a group comprising of Ru, Rh, Pd, Ir, Pt having a short spin scattering distance.

Furthermore, the electrode 41 may be made of a laminated film of an alloy containing at least two selected from a group comprising of Cu, Au, Ag and Al having a long spin scattering distance, and an alloy containing at least two selected from a group comprising of Ru, Rh, Pd, Ir, Pt having a short spin scattering distance.

Use of above materials as materials for electrode 41 enables the damping constant of the spin injection layer 30 to increase. This allows a stable magnetic recording to be realized and a further high density recording to be performed by increasing the damping constant of the spin injection layer 30 as described in the fourth embodiment of the invention.

Figure 18:
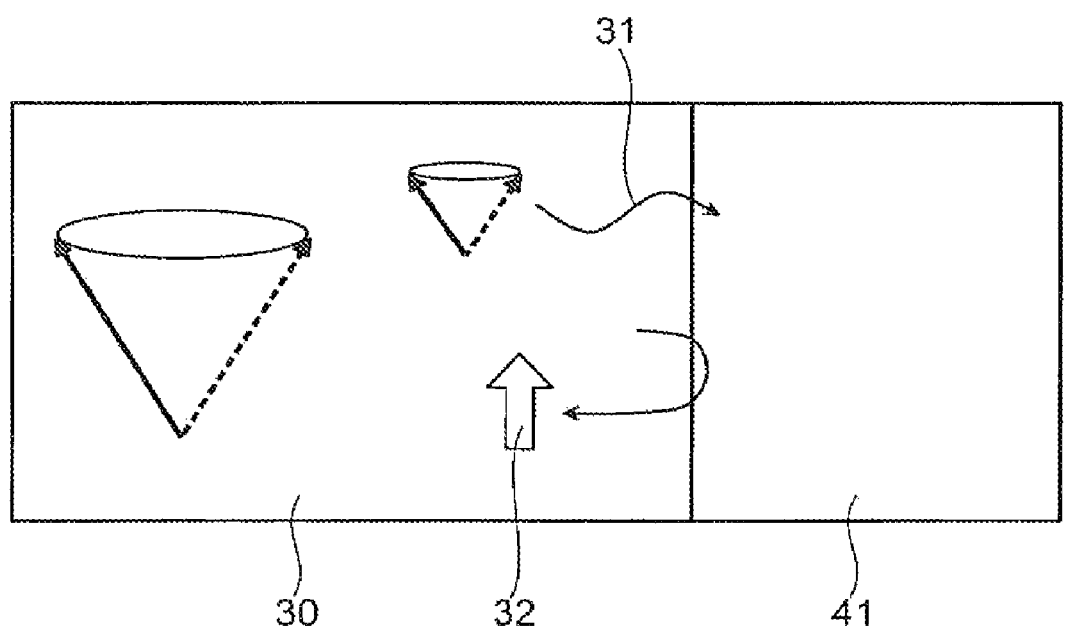
FIG. 18 is a conceptual view illustrating a characteristic of spin torque in the magnetic recording head according to the fifth embodiment of the invention.

FIG. 18 is a conceptual view illustrating a characteristic of spin torque in the magnetic recording head 5 according to the fifth embodiment of the invention.

More specifically, FIG. 18 is the conceptual view for illustrating a reason why using materials having a short spin scattering distance for the electrode 41 on the spin injection layer 30 side enables the damping constant of the spin injection layer 30 to increase.

As shown in FIG. 18, when the magnetization rotates due to fluctuation of the magnetization of the spin injection layer 30, a spin flow 31 flows into the electrode 41 from the spin injection layer 30. The spin flow 31 gets angular momentum from the magnetization of the spin injection layer 30. Since the spin scattering distance of the electrode 41 is short, the spin flow arriving at the electrode 41 is completely absorbed in the vicinity of the interface with the spin injection layer 30, little flow returns from the electrode 41 to the spin injection layer 30. Thus, almost all angular momentum of the spin flow 31 is scattered at the electrode 41. More specifically, this is equivalent to that the spin torque 32 is applied from the electrode 41 in a direction lowering the rotation, when the electrode 41 made of materials having a short spin scattering distance is adjacent to the spin injection layer 30 with rotating magnetization, and corresponds to the effective increase of the damping constant.

It is noted that the damping constant decreases similarly in a laminated film which the spin injection layer 30, materials having a long spin scattering distance and materials having a short spin scattering distance are laminated in this order, and a thickness of the materials having a long spin scattering distance is less than the spin scattering distance. It is for this reason that the spin flow generated in the spin injection layer 30 arrives at materials having a short spin scattering distance without disturbance during passing through materials having a long spin scattering distance.

When the bias layer 20 is provided, the electrode 42 adjacent to the bias layer 20 may be made of a material containing at least one selected from a group comprising of Ru, Rh, Pd, Ir and Pt having a short spin scattering distance, further more, electrode 42 adjacent to the bias layer 20 may be made of an alloy containing at least two selected from a group comprising of Ru, Rh, Pd, Ir and Pt.

Alike the electrode 41 described above, the electrode 42 may be made of a laminated film of a film containing at least one selected from a group comprising of Cu, Au, Ag and Al having a long spin scattering distance or an alloy containing at least two selected from the group, and a film containing at least one selected from a group comprising of Ru, Rh, Pd, Ir, Pt having a short spin scattering distance or an alloy containing at least two selected from the group.

Use of above materials as materials for electrode 41 enables the damping constant of the bias layer 20 to increase. The reason why the damping constant is allowed to be increased is the same reason why the damping constant of the spin injection layer 30 described above is increased. Increase of the damping constant of the bias layer 20 using the electrode material like this enables the magnetic recording head 5 according to this embodiment to perform a further high density recording alike the fourth embodiment.

It is noted that the electrode 42 may contain at least one selected from a group comprising of Ru, Rh, Pd, Ir and Pt also when the bias layer 20 is not provided.

Furthermore, both the electrode 41 and the electrode 42 may contain at least one selected from a group comprising of Ru, Rh, Pd, Ir and Pt.

Furthermore, at least any one of the spin injection layer 30 and the bias layer 20 may contain at least one selected from a group comprising of Ru, W, Re, Os, Ir, Eu, Tb, Gd, Dy, Ho, Rh and Pd as described in the fourth embodiment, and at least any one of the electrode 41 and the electrode 42 may simultaneously contain at least one selected from a group comprising of Ru, Rh, Pd, Ir and Pt.

Sixth Embodiment

Next, a sixth embodiment of the invention will be described.

Figure 19:
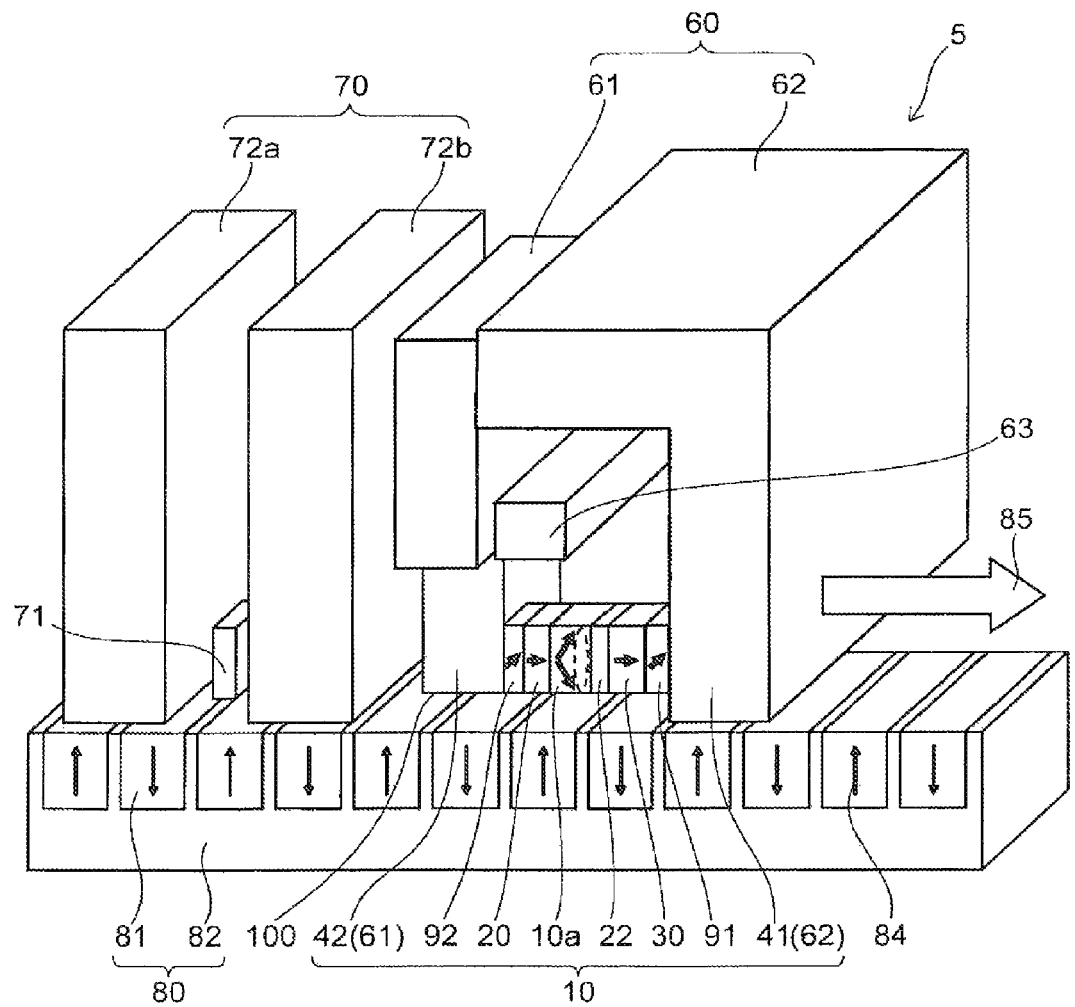
FIG. 19 is a perspective view showing the schematic configuration of a magnetic recording head according to a sixth embodiment of the invention.

FIG. 19 is a perspective view illustrating the schematic configuration of a magnetic recording head 5 according to the sixth embodiment of the invention.

As shown in FIG. 19, the magnetic recording head 5 according to the sixth embodiment of the invention is provided with the shield 62 placed on the trailing side of the main magnetic pole 61, and the laminated body of the spin torque oscillator 10 is provided between the main magnetic pole 61 and the shield 62. The direction from the main magnetic pole 61 to the shield 62 is substantially parallel to the lamination direction (thickness direction of the layer) of the spin torque oscillator 10. The spin injection layer 30 and the oscillation layer 10a are magnetized substantially parallel to the lamination direction, i.e., in the direction from the main magnetic pole 61 to the shield 62 or in the opposite direction.

A second bias layer (sixth magnetic layer) 91 adjacent to the spin injection layer 30 and a third bias layer (seventh magnetic layer) 92 adjacent to the bias layer 20 are further provided. These second bias layer 91 and the third bias layer 92 are magnetized substantially parallel to the lamination direction of the spin torque oscillator 10, i.e., in the direction from the main magnetic pole 61 to the shield 62 or in the opposite direction slightly slanted perpendicularly to the lamination direction.

More specifically, an easy magnetization axis of the second bias layer (sixth magnetic layer) 91 is substantially perpendicular to a normal line of the surface of the main magnetic pole 61 opposed to the laminated body. An easy magnetization axis of the third bias layer (seventh magnetic layer) 92 is also substantially perpendicular to a normal line of the surface of the main magnetic pole 61 opposed to the laminated body.

Furthermore, an absolute value of the crystalline anisotropy magnetic field of the second bias layer (sixth magnetic layer) 91 is more than or equal to ½ of the saturation flux density of the second bias layer (sixth magnetic layer) 91. An absolute value of the crystalline anisotropy magnetic field of the third bias layer (seventh magnetic layer) 92 is more than or equal to ½ of the saturation flux density of the third bias layer (seventh magnetic layer) 92.

It is noted that in the magnetic recording head 5 according to this embodiment the shield 62 serves as the electrode 41 on the spin injection layer 30 side, and the main magnetic pole 61 serves as the electrode 42 on the oscillation layer 10a side. That is, this is the case that a pair of electrodes are the main magnetic pole 61 and the shield 62. The back gap portions of the main magnetic pole 61 and the shield 62 are naturally electrically insulated each other. While in this embodiment, the main magnetic pole 61 and the shield 62 are directly adjacent to the laminated body, a metal body may be inserted between the main magnetic pole 62 and the shield 62 and the laminated body in order to adjust the distance between the main magnetic pole 61 and the shield 62 and the laminated body.

A size of the spin torque oscillator in the vertical direction to the current direction is, for example, a square of 600 Å edges. The third bias layer 92 adjacent to the bias layer 20 can be made of, for example, CoIr with a film thickness of 100 Å. The bias layer 20 can be made of, for example, a CoCr alloy with a film thickness of 400 Å. The oscillating layer 10a can be made of, for example, a laminated body of FeCo with a film thickness of 30 Å, NiFe with a film thickness of 30 Å, FeCo with a film thickness of 30 Å and NiFe with a film thickness of 30 Å laminated in this order. The intermediate layer can be made of, for example, Cu with a film thickness of 30 Å. The spin injection layer 30 can be made of, for example, a CoPt alloy with a film thickness of 200 Å. The second bias layer 91 adjacent to the spin injection layer 30 can be made of, for example, FeCo with a film thickness of 50 Å.

It is noted that the oscillating layer 10a and the intermediate layer 22 can be based on the materials and the laminated structure described in the first embodiment.

Furthermore, the bias layer 20 and the spin injection layer 30 may be made of a Co-based hard magnetic alloy such as CoCr alloy or the like. In order to set the bias layer 20 and the spin injection layer 30 to be a single magnetic domain or to be within a recording gap, these film thicknesses may be adjusted suitably between 100 Å and 800 Å.

In addition, the additive elements described in the fourth embodiment may be added to the spin injection layer 30.

The second bias layer 91 and the third bias layer 92 can be based on the high-Bs soft magnetic materials described in the first embodiment and materials having a negative uniaxial crystalline anisotropy such as CoIr or the like and a laminated structure of them. When materials of the second bias layer 91 and the third bias layer 92 or the laminated structure are changed, the saturation flux densities and the crystalline anisotropy magnetic fields of the second bias layer 91 and the third bias layer 92 can be adjusted and the magnetization inversion time can be adjusted.

Figure 20:
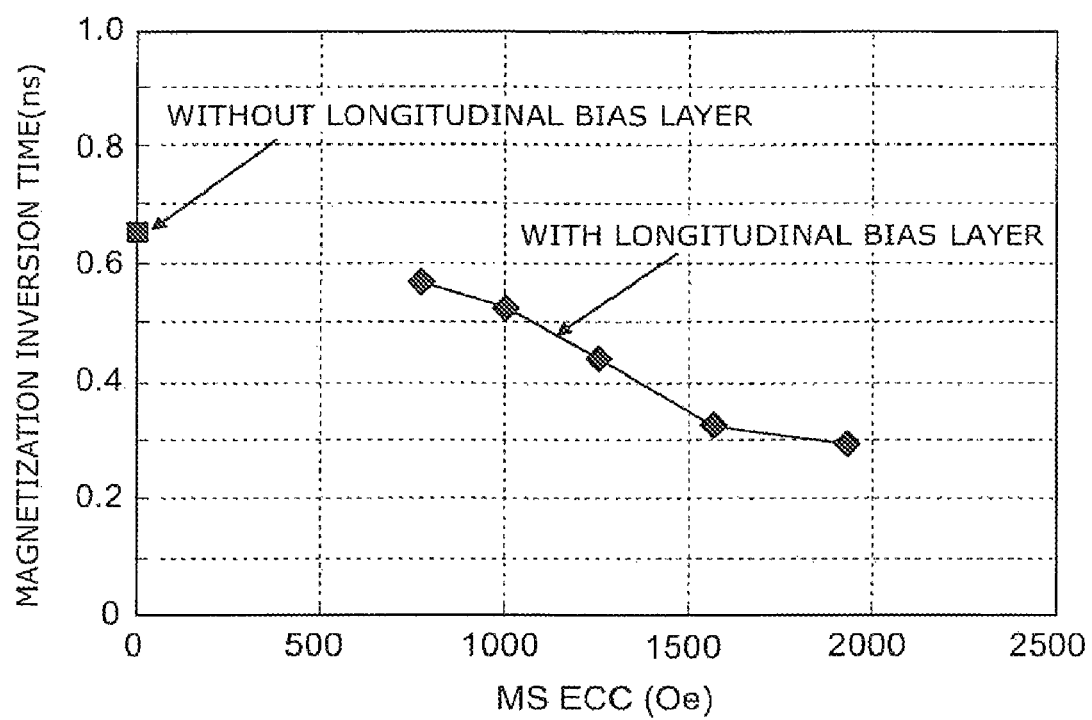
FIG. 20 is a graph illustrating a characteristic of the magnetic recording head according to the sixth embodiment of the invention.

FIG. 20 is a graph illustrating a characteristic of the magnetic recording head 5 according to the sixth embodiment of the invention.

More specifically, FIG. 20 shows the relationship between the saturation flux density of the second bias layer 91 adjacent to the spin injection layer 30 and the magnetization inversion time of the spin injection layer 30.

In figure the same, by taking the second bias layer 91 as a laminated body of NiFe and FeCo and changing a film thickness ratio of NiFe and FeCo, the saturation flux density of the second bias layer 91 is changed from 800 emu/cc to 1950 emu/cc. The magnetization inversion time is defined in the same way as described in the fourth embodiment.

As shown in FIG. 20, when the second bias layer 91 (longitudinal bias layer) is not provided, the magnetization inversion time is 0.65 ns, but laminating the second bias layer 91 (longitudinal bias layer) on the spin injection layer 30 shortens the magnetization inversion time to 0.56~0.29 ns.

In this way, shortening of the magnetization inversion time enables break of radio frequency magnetic field generation to minimize at inversion of the magnetic field from the magnetic main pole, allowing a stable magnetic recording. Particularly the higher the saturation flux density of the second bias layer 91, the shorter the magnetization inversion time becomes. This is the reason why with the increase of the saturation flux density of the second bias layer 91 influence of the shape anisotropy becomes larger, and the longitudinal magnetization component of the second bias layer 91 becomes larger. Through the exchange-coupling force a longitudinal torque proportional to the longitudinal magnetization component of the second bias layer 91 is applied to the spin injection layer 30, the larger the torque, a high speed magnetization inversion becomes possible.

It is noted that the characteristic of the second bias layer 91 adjacent to the spin injection layer described above can also be applied to the third bias layer 92 adjacent to the bias layer 20.

On the other hand, when the exchange coupling force between the spin injection layer 30 and the second bias layer 91 is too strong, the second bias layer 91 may be magnetized perpendicularly due to the perpendicular torque from the spin injection layer. In this case, since there is no longitudinal magnetization component in the second bias layer 91, no longitudinal torque component is applied to the spin injection layer 30, and the magnetization inversion time becomes impossible to be reduced. In order to avoid the situation like this, the exchange coupling force between the spin injection layer 30 and the second bias layer 91 may be adjusted by inserting a nonmagnetic layer but not laminating directly the spin injection layer 30 and the second bias layer 91.

The exchange coupling force between these layers may be adjusted by inserting a nonmagnetic layer similarly between the bias layer 20 and the third bias layer 92 adjacent to the bias layer 20.

Furthermore, an overshoot current may be passed through a magnetic main pole coil at the magnetization inversion. The overshoot current enables the magnetization inversion time to reduce. This is the reason why the overshoot current increases the magnetic field and the torque from the main magnetic pole 61 to the spin torque oscillator 10. A magnitude of the overshoot current, a rise time, a holding time and a fall time may be adjusted so that a bit error code of recording is optimized.

Furthermore, in order to invert early an oscillating state of the oscillation layer 10a, a current pulse may be superposed on a driving current at the magnetization inversion. An oscillation direction of the oscillation layer 10a is also inverted at the magnetization inversion corresponding to the magnetization inversion of the bias layer 20 and the spin injection layer 30. Superposing the pulse current on the driving current increases the spin torque to the oscillation layer 10a by the pulse current. Consequently, the oscillation direction of the oscillation layer 10a is allowed to invert in quick response to the magnetization inversion of the bias layer 20 and the spin injection layer 30. Strength of the pulse current, a rise time, a holding time, a fall time and procrastination and delay of pulse start timing to the magnetization inversion may be adjusted so that overwriting of recording and a bit error rate is optimized.

It is noted that the magnetic recording head 5 according to this embodiment described above is provided with both the second bias layer 91 adjacent to the spin injection layer 30 and the third bias layer 92 adjacent to the bias layer 20, however the invention is not limited to this, any one of the second bias layer 91 adjacent to the spin injection layer 30 and the third bias layer 92 adjacent to the bias layer 20 may be provided. This can reduce the magnetization inversion time and enables a stable magnetic recording.

Seventh Embodiment

Next, a seventh embodiment of the invention will be described.

Figure 21:
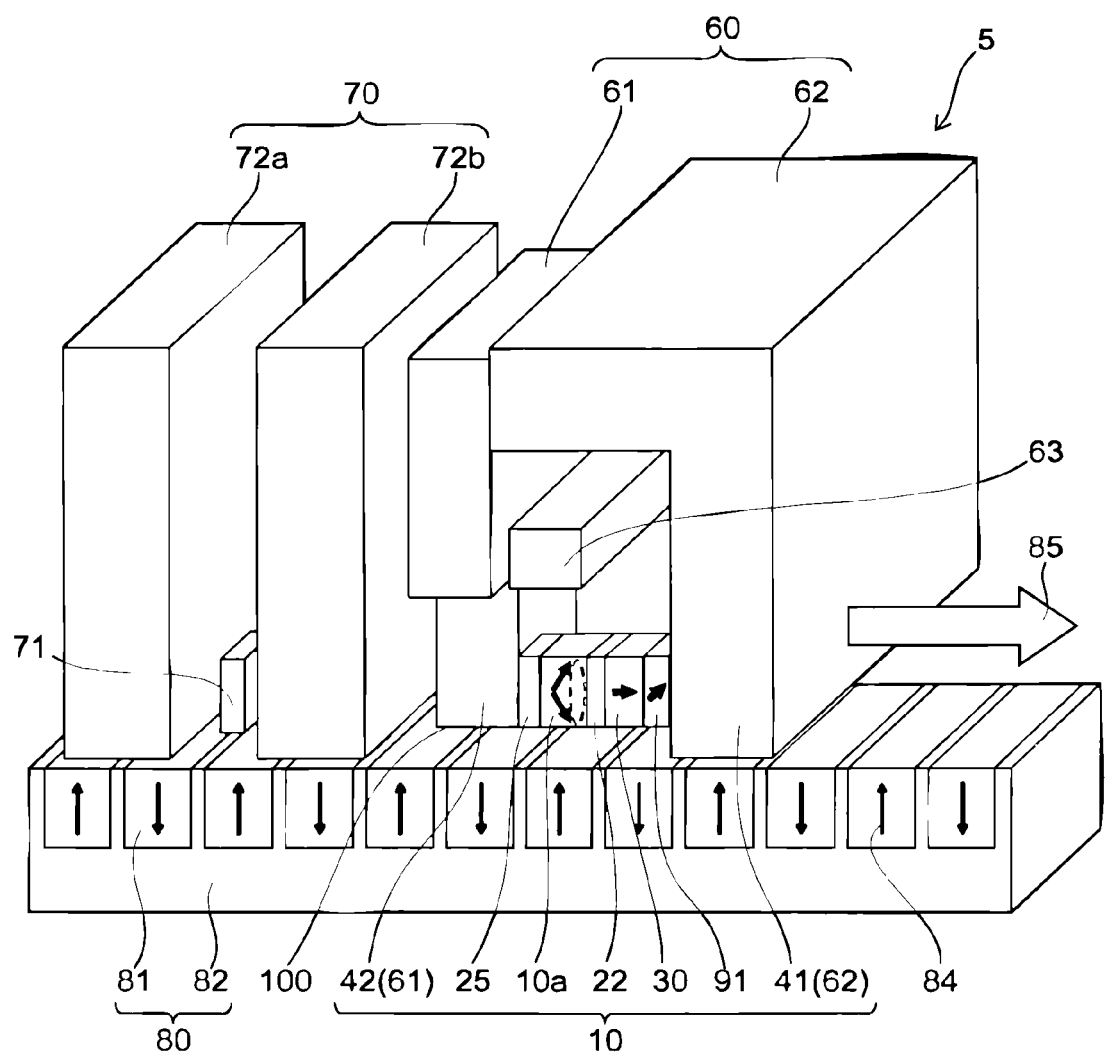
FIG. 21 is a perspective view showing the schematic configuration of a magnetic recording head according to a seventh embodiment of the invention.

FIG. 21 is a perspective view illustrating the schematic configuration of a magnetic recording head 5 according to the seventh embodiment of the invention.

As shown in FIG. 21, the magnetic recording head 5 according to the seventh embodiment of the invention is provided with the shield 62 placed on the trailing side of the main magnetic pole 61, and the laminated body of the spin torque oscillator 10 is provided between the main magnetic pole 61 and the shield 62. The direction from the main magnetic pole 61 to the shield 62 is substantially parallel to the lamination direction (thickness direction of the layer) of the spin torque oscillator 10. The spin injection layer 30 and the oscillation layer 10a are magnetized substantially parallel to the lamination direction, i.e., in the direction from the main magnetic pole 61 to the shield 62 or in the opposite direction.

The second bias layer (sixth magnetic layer) 91 adjacent to the spin injection layer 30 is provided. The second bias layer 91 is magnetized substantially parallel to the lamination direction from the main magnetic pole 61 to the shield 62 or in the opposite direction slightly slanted perpendicularly to the lamination direction.

The oscillation layer 10a of the spin torque oscillator 10 can be made of, for example, a laminated body of FeCo with a film thickness of 30 Å and CoFeB with a thickness of 90 Å. The intermediate layer 22 can be made of, for example, Cu with a film thickness of 30 Å. The spin injection layer 30 can be made of, for example, CoPt alloy with a thickness of 200 Å.

Furthermore, the second bias layer 91 adjacent to the spin injection layer 30 can be made of, for example, CoIr with a film thickness of 100 Å.

Furthermore, a laminated structure body 25 of Ta with a film thickness of 30 Å, Ru with a film thickness of 30 Å, and Cu with a film thickness of 30 Å is provided between the oscillation layer 10a and the main magnetic pole 61. The laminates structure body 25 and the main magnetic pole 61 serve as the electrode 42 on the oscillation layer 10a side and the shield 62 serves as the electrode 41 on the spin injection layer 30 side. The back gap portions of the main magnetic pole 61 and the shield 62 are electrically insulated each other. The laminated structure body 25 allows a distance between the main magnetic pole 61 and the oscillation layer 10a to be adjusted, and a recording magnetic field to be superposed effectively on a radio frequency magnetic field on the medium. A metal body may be inserted between the spin injection layer 30 and the shield depending on the film thicknesses of the oscillation layer 10a and the spin injection layer 30.

It is noted that the oscillation layer 10a and the intermediate layer 22 can be based on the material and the structure described in the first embodiment.

Furthermore, the spin injection layer 30 can be made of Co-based hard magnetic alloy such as CoCr or the like. The film thickness of the spin injection layer 30 may be adjusted suitably between 100 Å and 800 Å.

In addition, the additive elements described in the fourth embodiment may be added to the spin injection layer 30.

Furthermore, the second bias layer 91 can be based on the high-Bs soft magnetic materials described in the first embodiment and materials having a negative uniaxial crystalline anisotropy and a laminated structure of them.

This time, it was discovered that the magnetization inversion time of the spin torque oscillator 10 of the magnetic recording head 5 according to this embodiment is 0.35 ns, being the fast inversion. The reason will be described below. As described in the sixth embodiment, it is essential for the faster magnetization inversion that the second bias layer 91 is magnetized in a longitudinal direction. An effective anisotropy magnetic field in a longitudinal direction considering crystalline anisotropy and shape anisotropy can be generally expressed as follows, and the larger this value, longitudinal magnetization becomes easier:

$$Hk_{effective}=Bs(Nd_{perpendicular}-Nd_{longitudinal})+Hk \quad (3)$$

where Hk is the crystalline anisotropy magnetic field of the second bias layer 91 in the longitudinal direction, Bs is the saturation flux density of the second bias layer 91 (that is, 4 nMs taking the saturated magnetization of the second bias layer 91 as Ms), $Nd_{perpendicular}$ is the demagnetizing field coefficient of the second bias layer 91 in the perpendicular direction, $Nd_{longitudinal}$ is the magnetizing field coefficient of the second bias layer 91 in the longitudinal direction.

$Nd_{perpendicular}-Nd_{longitudinal}$ is generally equal to 0.5 or more. Since the saturated magnetization of CoIr used for the second bias layer 91 is 1000 emu/cc, Bs ($Nd_{perpendicular}-Nd_{longitudinal}$)=6.3 kOe is obtained. Since the crystalline anisotropy magnetic field of CoIr of the second bias layer 91 is −10 kOe in the perpendicular direction, the longitudinal anisotropy magnetic field can be considered to be Hk=+10 kOe effectively in this formula. Consequently, the effective anisotropy magnetic field of the second bias layer 91 is extremely high, $Hk_{effective}$=16.3 kOe, being easy to be magnetized longitudinally. As a result, speed enhancement of the magnetization inversion time is allowed.

The reason why the effective anisotropy magnetic field becomes large is that the crystalline anisotropy magnetic field of CoIr is extremely large, 10 kOe, compared with Bs ($Nd_{perpendicular}-Nd_{longitudinal}$). As described above, when the crystalline anisotropy magnetic field is equal to Bs ($Nd_{perpendicular}-Nd_{longitudinal}$) or more, the crystalline anisotropy magnetic field becomes extremely large, allowing the second bias layer 91 to be magnetized easily in the longitudinal direction and the magnetization inversion time to be shortened. As a result, this enables application to a magnetic recording apparatus having a higher transfer rate.

It is noted that the magnetic recording head according to this embodiment described above is an example providing the second bias layer 91 adjacent to the spin injection layer 30, however the invention is not limited to this, the bias layer 20 and the third bias layer 92 adjacent to the bias layer 20 may be provided. As a result, the same mechanism as the second bias layer 91 described above enables speed enhancement of the magnetization inversion time.

Eighth Embodiment

Next, an eighth embodiment of the invention will be described.

Figure 22:
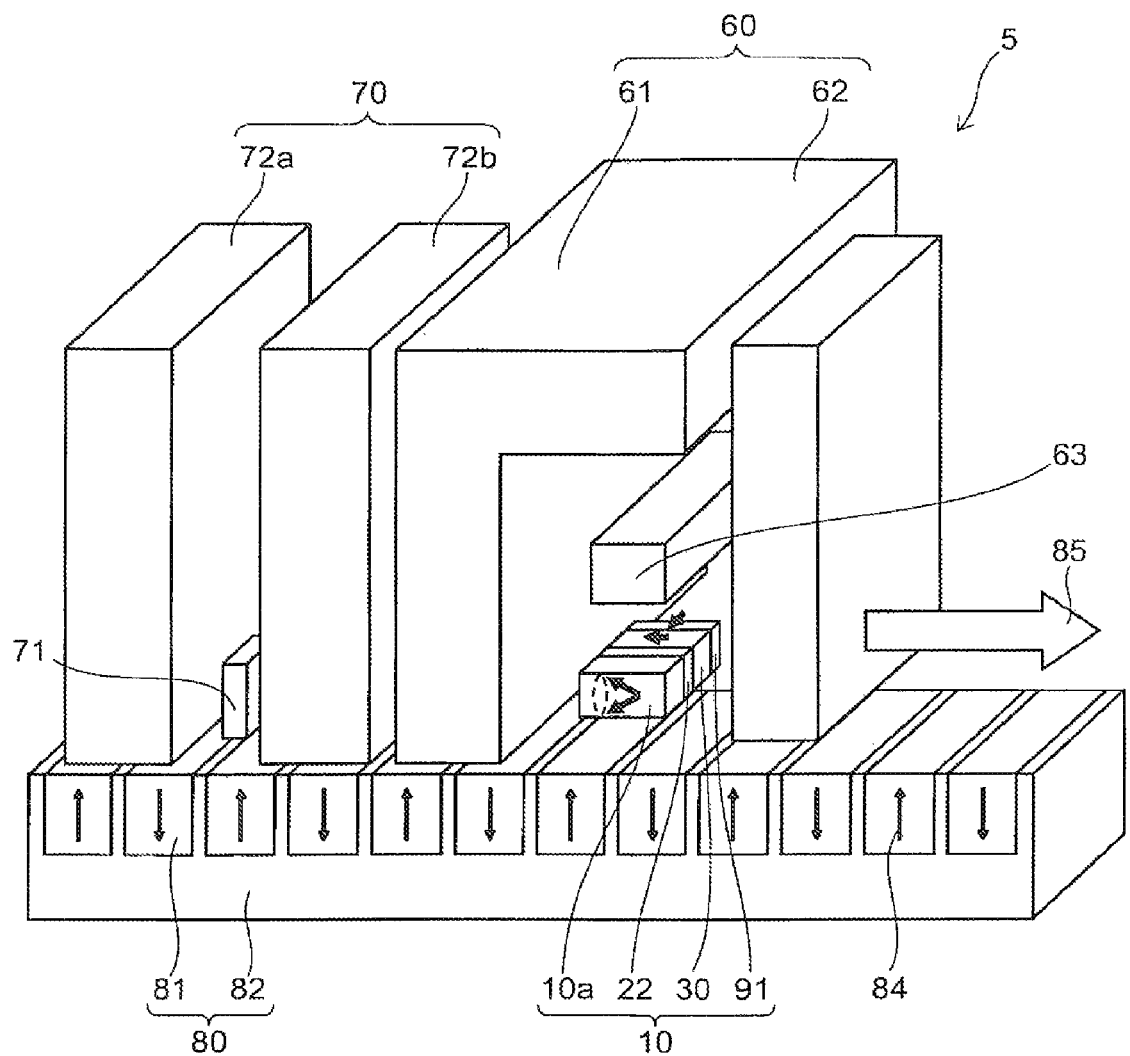
FIG. 22 is a perspective view showing the schematic configuration of a magnetic recording head according to an eighth embodiment of the invention.

FIG. 22 is a perspective view illustrating the schematic configuration of a magnetic recording head 5 according to the eighth embodiment of the invention.

As shown in FIG. 22, the magnetic recording head 5 according to the fifth embodiment of the invention is provided with the shield 62 placed on the trailing side of the main magnetic pole 61, and the spin torque oscillator 10 is provided between the main magnetic pole 61 and the shield 62. The direction from the main magnetic pole 61 to the shield 62 is substantially perpendicular to the lamination direction (thickness direction of the layer) of the spin torque oscillator 10. The spin injection layer 30 and the oscillation layer 10a are magnetized substantially perpendicular to the lamination direction, i.e., in the direction from the main magnetic pole 61 to the shield 62 or in the opposite direction.

A size of the spin torque oscillator 10 in the vertical direction to the current direction is, for example, a rectangle of 300 Å×500 Å. The oscillation layer 10a can be based on, for example, a laminated body of FeCo with a film thickness of 60 Å and CoFeB with a film thickness of 90 Å. The intermediate layer 22 can be made of, for example, Cu with a film thickness of 30 Å. The spin injection layer 30 can be made of, for example, CoIr alloy with a thickness of 300 Å. The second bias layer 91 can be made of CoPt with a film thickness of 50 Å.

It is noted that the oscillation layer 10a and the intermediate layer 22 can be based on the materials and the laminated structure described in the first embodiment.

In order to set the spin injection layer 30 to be a single magnetic domain or to be within a recording gap, the film thicknesses of the spin injection layer 30 may be adjusted suitably between 100 Å and 800 Å.

It is noted that the additive elements described in the fourth embodiment may be added to the spin injection layer 30.

The second bias layer 91 may be made of a Co-based hard magnetic alloy such as a CoCr alloy or the like.

Furthermore, the spin injection layer 30 and the second bias layer 91 may not be laminated directly. The exchange coupling force between these layers may be adjusted by inserting a nonmagnetic layer.

The magnetization inversion time of the spin injection layer 30 of the magnetic recording head 5 according to this embodiment becomes to be 0.25 ns by inserting the bias layer 91, being possible to enhance the speed of the magnetization inversion. This is the reason why the second bias layer 91 is magnetized perpendicularly and this magnetization causes torque in a perpendicular direction to the magnetization of the spin injection layer 30 through a static magnetic coupling and the exchange coupling.

A condition for the second bias layer 91 to be magnetized perpendicularly is expressed as follows:

(4)

$$Hk - Bs(Nd_{perpendicular} - Nd_{longitudinal}) > 0 \quad (4)$$

where Hk is the crystalline anisotropy magnetic field of the second bias layer 91 in the longitudinal direction, Bs is the saturation flux density of the second bias layer 91 (4 nMs taking the saturated magnetization of the second bias layer 91 as Ms), $Nd_{perpendicular}$ is the demagnetizing field coefficient of the second bias layer 91 in the perpendicular direction, $Nd_{longitudinal}$ is the magnetizing field coefficient of the second bias layer 91 in the longitudinal direction. Since $Nd_{perpendicular} - Nd_{longitudinal}$ is generally equal to 0.5 or more, it is necessary for the crystalline anisotropy magnetic field to be 0.5 times of the saturation flux density ($Bs = 4\pi Ms$) or more so that the second bias layer 91 is magnetized perpendicularly. Satisfaction of the condition like this enables the speed enhancement of the magnetization inversion time and application at a higher transfer rate.

It is noted that the magnetic recording head 5 according to this embodiment described above is an example providing the second bias layer 91 adjacent to the spin injection layer 30, however the invention is not limited to this, the bias layer 20 and the third bias layer 92 adjacent to the bias layer 20 may be provided. As a result, the description about a characteristic of the second bias layer 91 described above can be applied to a characteristic of the third bias layer 92.

Ninth Embodiment

Next, a ninth embodiment of the invention will be described.

Figure 23:
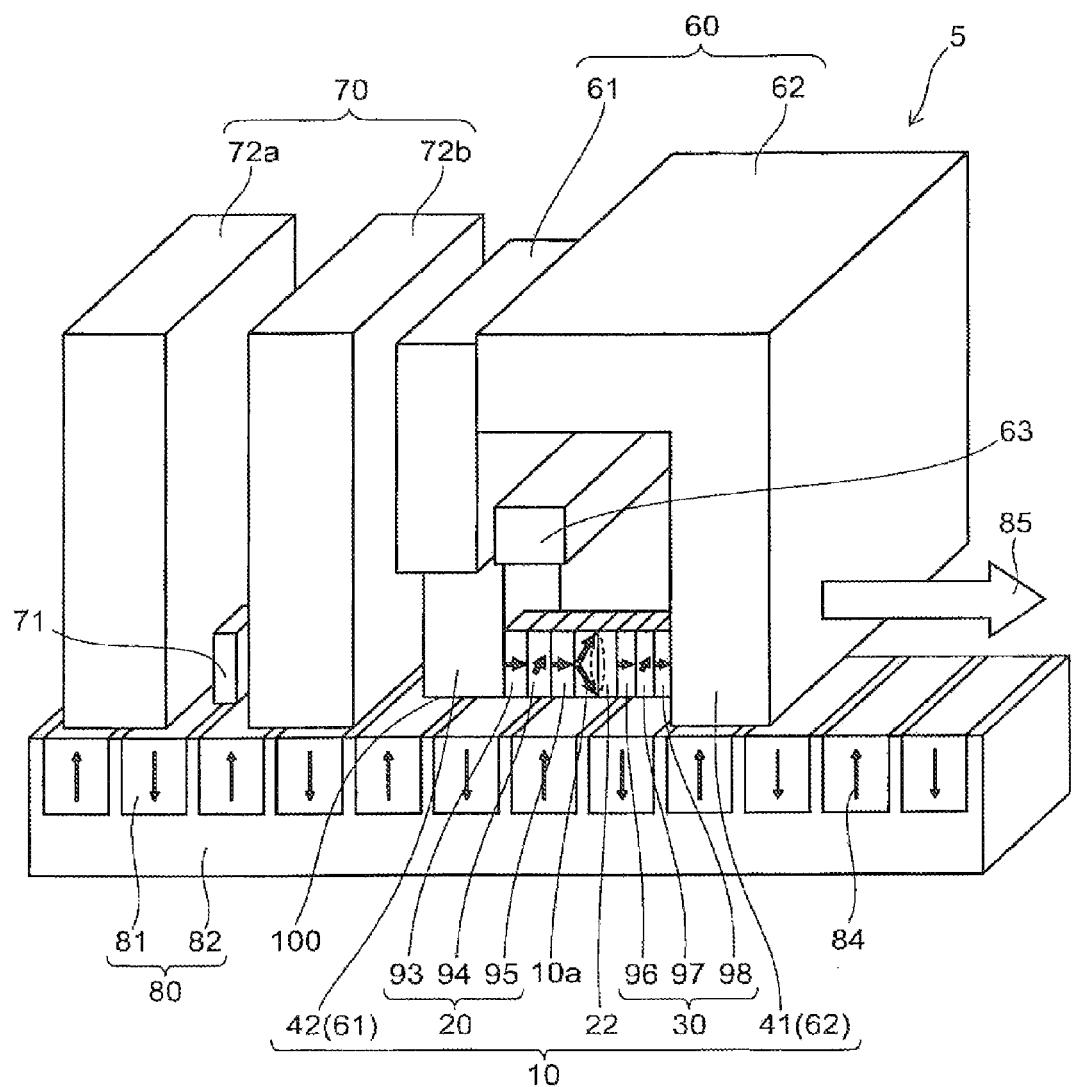
FIG. 23 is a perspective view showing the schematic configuration of a magnetic recording head according to a ninth embodiment of the invention.

FIG. 23 is a perspective view illustrating the schematic configuration of a magnetic recording head 5 according to the ninth embodiment of the invention.

As shown in FIG. 23, the magnetic recording head 5 according to this embodiment is different from the magnetic recording head illustrated in FIG. 15 in the structure of the spin torque oscillator 10. That is, similar layers serving as the second bias layer 91 and the third bias layer 92 have a structure laminated in the spin injection layer 30 and the bias layer 20, respectively.

More specifically, the spin injection layer 30 has an eighth magnetic layer (magnetic layer 96 and magnetic layer 98) and a ninth magnetic layer (magnetic layer 94) laminated on the eighth magnetic layer. The ninth magnetic layer (magnetic layer 97) has a higher magnetic flux density than the eighth magnetic layer (magnetic layer 96 and magnetic layer 98).

Furthermore, the bias layer 20 has a tenth magnetic layer (magnetic layer 93 and magnetic layer 95) and an eleventh magnetic layer (magnetic layer 94) laminated on the tenth magnetic layer. The eleventh magnetic layer (magnetic layer 94) has a higher saturation magnetic flux density than the tenth magnetic layer (magnetic layer 93 and magnetic layer 95).

More specifically, the ninth magnetic layer serves as the above second bias layer 91, and the eleventh magnetic layer serves as the above third bias layer 92. As a result, the same effect as the second bias layer 91 and the third bias layer 92 described above enables speed enhancement of the magnetization inversion time and application at a higher transfer rate.

The magnetic recording head 5 illustrated in FIG. 23 is an example that the spin injection layer 30 and the bias layer 20 have the laminated structure of the eighth magnetic layer and the ninth magnetic layer and the laminated structure of the tenth magnetic layer and the eleventh magnetic layer, respectively, however, any one of the spin injection layer 30 and the bias layer 20 may have the laminated structure of the eighth magnetic layer and the ninth magnetic layer or the laminated structure of the tenth magnetic layer and the eleventh magnetic layer.

The magnetic recording head 5 illustrated in FIG. 23 has the spin injection layer 30 having the structure of the ninth magnetic layer (magnetic layer 97) sandwiched by the two eighth magnetic layer (magnetic layer 96, 98), however, the eighth magnetic layer may be a single layer, the ninth magnetic layer being laminated on the single eighth magnetic layer. Similarly, the tenth magnetic layer may be a single layer, the eleventh magnetic layer being laminated on the tenth magnetic layer.

Furthermore, at least any one of the spin injection layer 30 and the bias layer 20 may be provided with the laminated structure of the eighth magnetic layer and the ninth magnetic layer oar the laminated structure of the tenth magnetic layer and the eleventh magnetic layer described in this embodiment, and simultaneously any one of the second bias layer 91 and the third bias layer 92 described in the sixth embodiment may be provided.

Furthermore, the structure having the eighth, the ninth, the tenth and the eleventh magnetic layer described in this embodiment and the structure having the second, the third bias layer, and the materials described in the fourth, the fifth embodiments may be simultaneously used.

Tenth Embodiment

Next, a magnetic recording apparatus according to an embodiment of the invention is described. More specifically, the magnetic recording head 5 of the invention described with reference to FIGS. 1-4, 6-7 and 10-23 is illustratively incorporated in an integrated recording-reproducing magnetic head assembly, which can be installed on a magnetic recording/reproducing apparatus.

Figure 24:
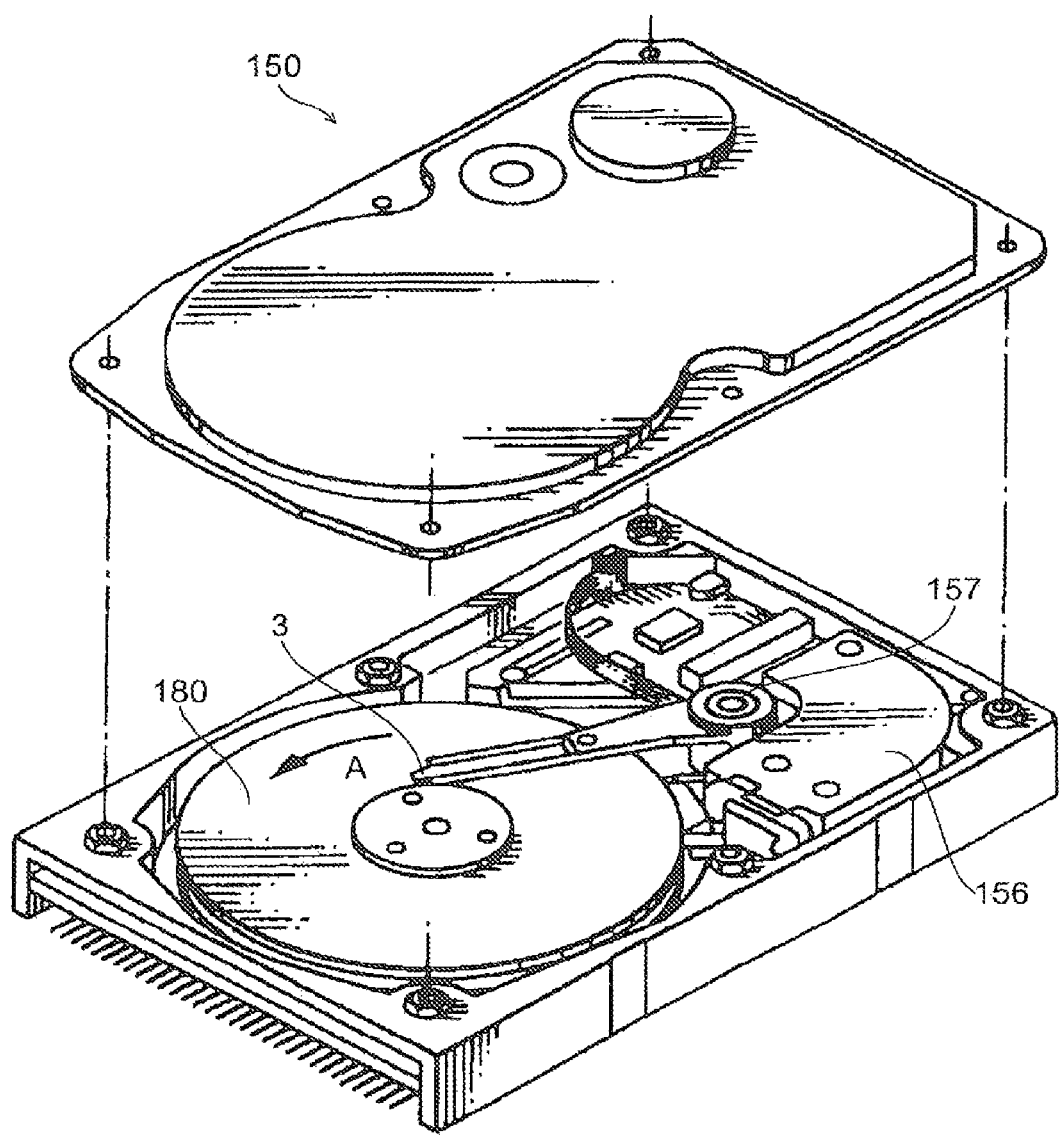
FIG. 24 is a principal perspective view illustrating the schematic configuration of a magnetic recording/reproducing apparatus according to a tenth embodiment of the invention.

FIG. 24 is a principal perspective view illustrating the schematic configuration of such a magnetic recording/reproducing apparatus.

More specifically, the magnetic recording/reproducing apparatus 150 of the invention is an apparatus based on a rotary actuator. In this figure, a recording medium disk (medium disk) 180 is mounted on a spindle 152 and rotated in the direction of arrow A by a motor, not shown, in response to a control signal from a drive controller, not shown. The magnetic recording/reproducing apparatus 150 of the invention may include a plurality of medium disks 180.

A head slider 3 for recording/reproducing information stored on the medium disk 180 has a configuration as described above with reference to FIG. 2 and is attached to the tip of a thin-film suspension 154. Here, a magnetic recording head according to any one of the above embodiments is illustratively installed near the tip of the head slider 3.

When the medium disk 180 is rotated, the air bearing surface (ABS) 100 of the head slider 3 is held at a prescribed floating amount from the surface of the medium disk 180. Alternatively, it is also possible to use a slider of the so-called "contact-traveling type", where the slider is in contact with the medium disk 180.

The suspension 154 is connected to one end of an actuator arm 155 including a bobbin for holding a driving coil, not shown. A voice coil motor 156, which is a kind of linear motor, is provided on the other end of the actuator arm 155. The voice coil motor 156 is composed of the driving coil, not shown, wound up around the bobbin of the actuator arm 155 and a magnetic circuit including a permanent magnet and an opposed yoke disposed so as to sandwich the coil therebetween.

The actuator arm 155 is held by ball bearings, not shown, provided at two positions above and below the spindle 157, and can be slidably rotated by the voice coil motor 156.

Figure 25:
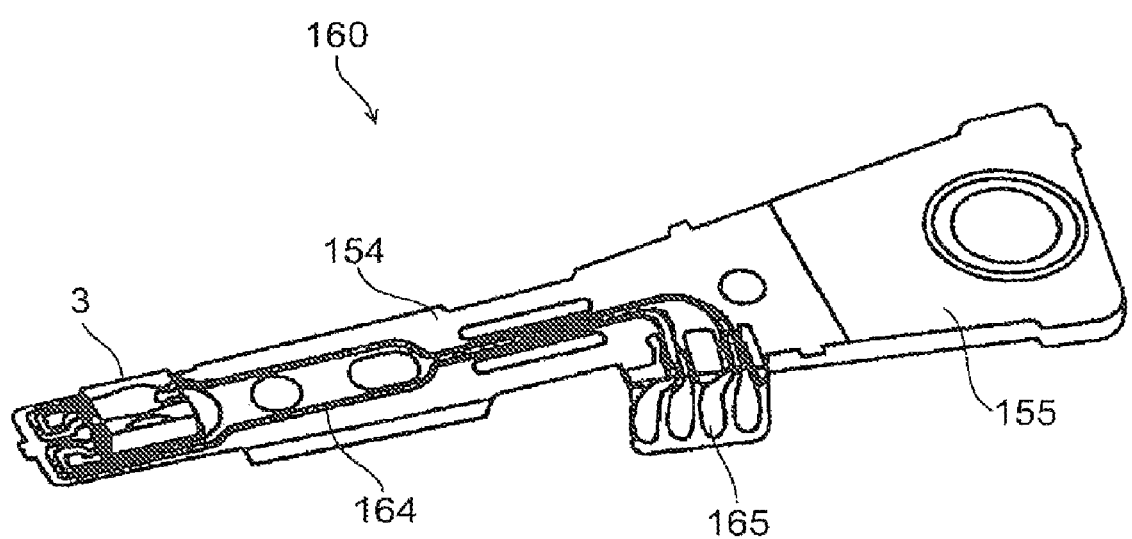
FIG. 25 is an enlarged perspective view of a magnetic head assembly ahead of an actuator arm 155 as viewed from the disk side.

FIG. 25 is an enlarged perspective view of the magnetic head assembly 160 ahead of the actuator arm 155 as viewed from the disk side. More specifically, the magnetic head assembly 160 has an actuator arm 155 illustratively including a bobbin for holding a driving coil, and a suspension 154 is connected to one end of the actuator arm 155.

To the tip of the suspension 154 is attached a head slider including any one of the magnetic recording heads 5 described above with reference to FIGS. 1-4, 6-23. The suspension 154 has a lead 164 for writing and reading signals. The lead 164 is electrically connected to each electrode of the magnetic head incorporated in the head slider 3. In the figure, the reference numeral 165 denotes an electrode pad of the magnetic head assembly 160.

According to the invention, by using the magnetic recording head as described above with reference to FIGS. 1-4, 6-23, it is possible to reliably record information on the perpendicular magnetic recording medium disk 180 with higher recording density than conventional. Here, for effective microwave assisted magnetic recording, preferably, the resonance frequency of the medium disk 180 to be used is nearly equal to the oscillation frequency of the spin torque oscillator 10.

Figure 26:
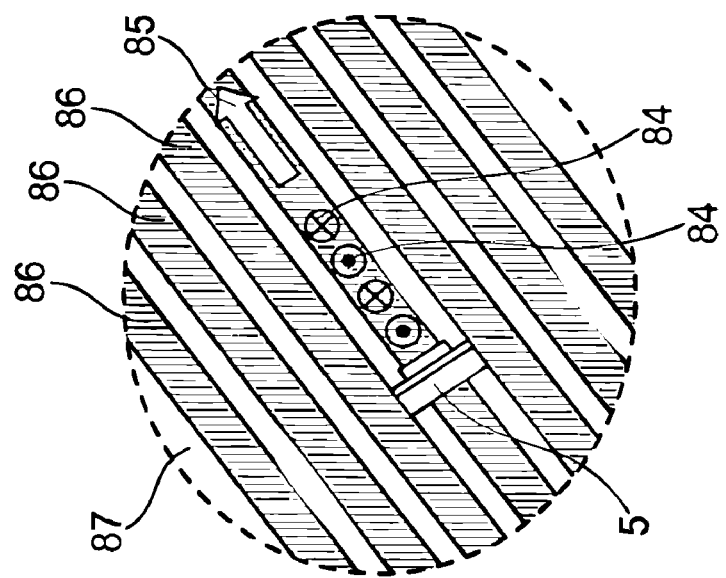
FIG. 26 is a schematic view illustrating a magnetic recording medium that can be used in this embodiment.
Figure 26:
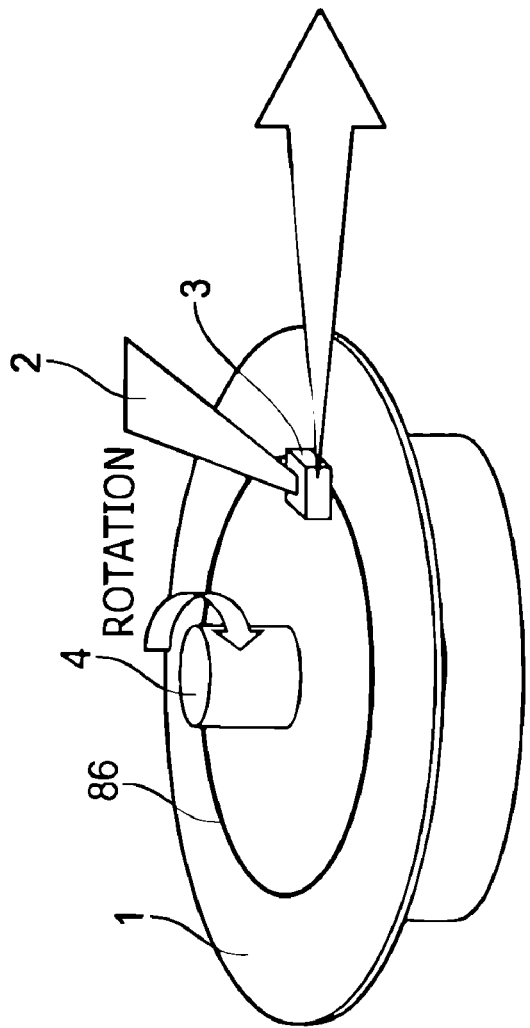

FIG. 26 is a schematic view illustrating a magnetic recording medium that can be used in this embodiment.

More specifically, the magnetic recording medium 1 of this embodiment includes perpendicularly oriented, multiparticle magnetic discrete tracks (recording track) 86 separated from each other by a nonmagnetic material (or air) 87. When this medium 1 is rotated by a spindle motor 4 and moved toward the medium moving direction 85, a recording magnetization 84 can be produced by the magnetic recording head 5 described above with reference to FIGS. 1-4, 6-23.

By setting the width (TS) of the spin torque oscillator 10 in the width direction of the recording track to not less than the width (TW) of the recording track 86 and not more than the recording track pitch (TP), it is possible to significantly prevent the decrease of coercivity in adjacent recording tracks due to leaked high-frequency magnetic field from the spin torque oscillator 10. Hence, in the magnetic recording medium 1 of this example, only the recording track 86 to be recorded can be effectively subjected to microwave assisted magnetic recording.

According to this embodiment, a microwave assisted magnetic recording apparatus with narrow tracks, i.e. high track density, is realized more easily than in the case of using a multiparticle perpendicular medium made of the so-called "blanket film". Furthermore, by using the microwave assisted magnetic recording scheme and using a magnetic medium material with high magnetic anisotropy energy (Ku) such as FePt or SmCo, which cannot be written by conventional magnetic recording heads, magnetic medium particles can be further downscaled to the size of nanometers. Thus it is possible to realize a magnetic recording apparatus having far higher linear recording density than conventional also in the recording track direction (bit direction).

Figure 27:
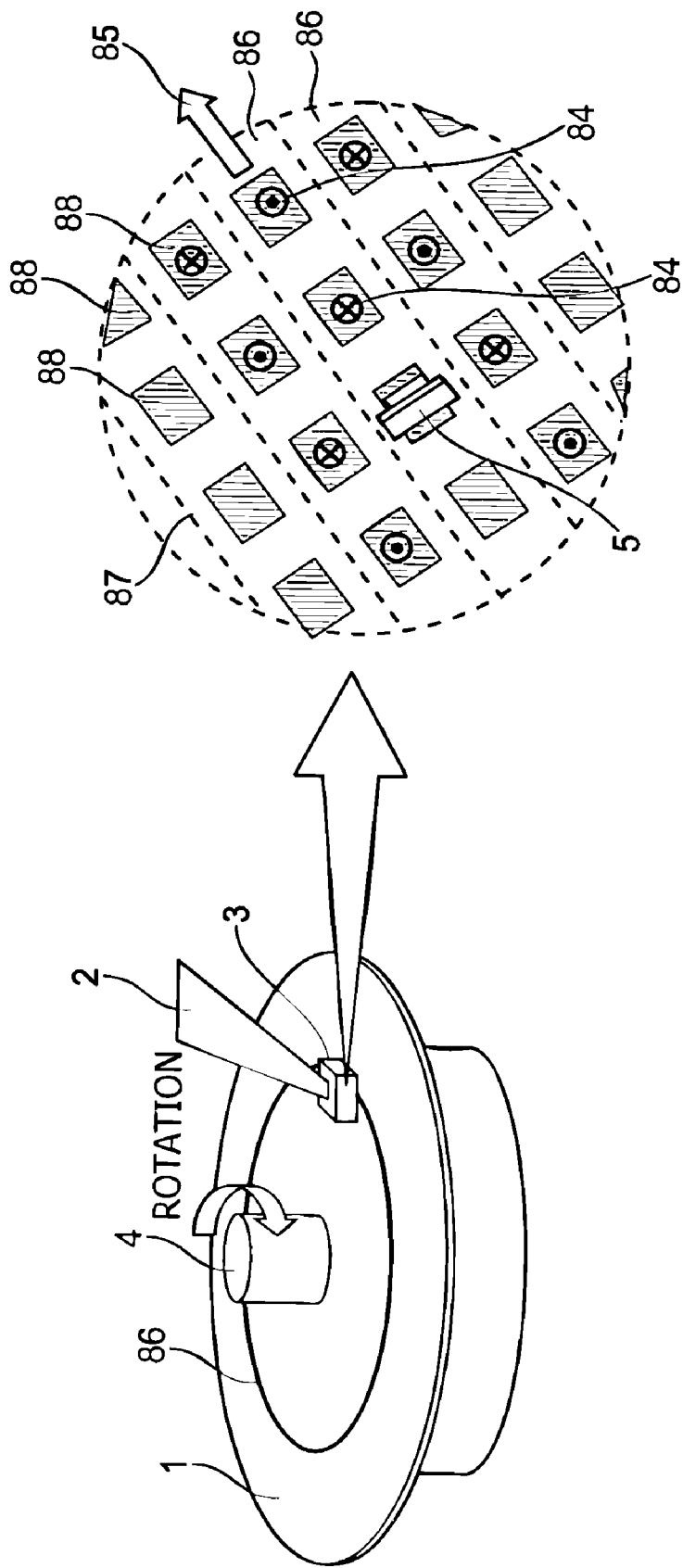
FIG. 27 is another schematic view illustrating a magnetic recording medium that can be used in this embodiment.

FIG. 27 is a schematic view illustrating another magnetic recording medium that can be used in this embodiment.

More specifically, the magnetic recording medium 1 of this example includes magnetic discrete bits 88 separated from each other by a nonmagnetic material 87. When this medium 1 is rotated by a spindle motor 4 and moved toward the medium moving direction 85, a recording magnetization 84 can be produced by the magnetic recording head 5 described above with reference to FIGS. 1-4, 6-23.

According to the invention, as shown in FIGS. 17 and 18, recording can be reliably performed also on the recording layer having high coercivity in a discrete-type magnetic recording medium 1, allowing magnetic recording with high density and high speed.

Also in this example, by setting the width (TS) of the spin torque oscillator 10 in the width direction of the recording track to not less than the width (TW) of the recording track 86 and not more than the recording track pitch (TP), it is possible to significantly prevent the decrease of coercivity in adjacent recording tracks due to leaked high-frequency magnetic field from the spin torque oscillator 10. Hence only the recording track 86 to be recorded can be effectively subjected to microwave assisted magnetic recording. According to this example, by downscaling the magnetic discrete bit 88 and increasing its magnetic anisotropy energy (Ku), there is a possibility of realizing a microwave assisted magnetic recording apparatus having a recording density of 10 Tbits/inch$^2$ or more as long as thermal fluctuation resistance under the operating environment can be maintained.

The embodiments of the invention have been described with reference to the examples. However, the invention is not limited to the above examples. For instance, two or more of the examples described above with reference to FIGS. 1-4, 6-7, 10-27 can be combined as long as technically feasible, and such combinations are also encompassed within the scope of the invention.

That is, the invention is not limited to the examples, but can be practiced in various modifications without departing from the spirit of the invention, and such modifications are all encompassed within the scope of the invention.

We claim:
1. A magnetic head comprising:
a reproducing head section including two magnetic shield layers and a magnetic reproducing device provided between the two magnetic shield layers; and
a writing head section including:
a main magnetic pole including a first portion, a second portion apart from the first portion, and a third portion provided between the first portion and the second portion;

a shield including a first portion separated from and facing the first portion of the main magnetic pole, a second portion separated from and facing the second portion of the main magnetic pole, and a third portion provided between the first and second portions of the shield and facing the third portion of the main magnetic pole;

a coil to generate an ampere magnetic field to magnetize the main magnetic pole to cause the magnetized main magnetic pole to generate a magnetic field, at least part of the coil being disposed between the third portion of the main magnetic pole and the third portion of the shield; and a laminated body being disposed between the first portion of the main magnetic pole and the first portion of the shield, the laminated body including a first magnetic layer having a coercivity lower than the magnetic field applied by the main magnetic pole, and a second magnetic layer having a coercivity lower than the magnetic field applied by the main magnetic pole, a distance between the second portion of the main magnetic pole and the second portion of the shield being shorter than a distance between the third portion of the main magnetic pole and the third portion of the shield, the second portion of the shield being electrically insulated from the second portion of the main magnetic pole.

2. The magnetic head according to claim 1, wherein the first magnetic layer and the second magnetic layer are laminated substantially perpendicular to a medium moving direction.

3. The magnetic head according to claim 1, wherein the first magnetic layer and the second magnetic layer are laminated substantially parallel to a medium moving direction.

4. The magnetic head according to claim 1, wherein
the coercivity of the first magnetic layer is lower than the coercivity of the second magnetic layer, and
a current is passed from the second magnetic layer to the first magnetic layer via the main magnetic pole and the shield.

5. The magnetic head according to claim 1, wherein the laminated body further includes a third magnetic layer provided between one of a pair of electrodes and the first magnetic layer, the electrode is located at the opposite side of the first magnetic layer as the second magnetic layer, and the third magnetic layer has a coercivity lower than the magnetic field applied by the main magnetic pole.

6. The magnetic head according to claim 5, wherein the third magnetic layer contains at least one element selected from a group consisting of Ru, W, Re, Os, Ir, Sm, Eu, Tb, Gd, Dy, Ho, Rh and Pd.

7. The magnetic head according to claim 5, wherein one of the pair of electrodes which is nearer to the third magnetic layer than the other of the electrodes contains at least one element selected from a group consisting of Ru, Rh, Pd, Ir and Pt.

8. The magnetic head according to claim 5, wherein
the laminated body further includes a fourth magnetic layer adjacent to the third magnetic layer,
the third magnetic layer is provided between the fourth magnetic layer and the first magnetic layer, and
an easy magnetization axis of the fourth magnetic layer is substantially perpendicular to a normal line of a surface of the main magnetic pole facing the laminated body.

9. The magnetic head according to claim 5, wherein the third magnetic layer includes a fourth magnetic layer and a fifth magnetic layer laminated on the fourth magnetic layer, and the saturation magnetic flux density of the fifth magnetic layer is higher than the saturation magnetic flux density of the fourth magnetic layer.

10. The magnetic head according to claim 1, wherein the second magnetic layer contains at least one element selected from a group consisting of Ru, W, Re, Os, Ir, Sm, Eu, Tb, Gd, Dy, Ho, Rh and Pd.

11. The magnetic head according to claim 1, wherein one of a pair of electrodes which is nearer to the second magnetic layer than the other of the electrodes contains at least one element selected from a group consisting of Ru, Rh, Pd, Ir and Pt.

12. The magnetic head according to claim 1, wherein the second magnetic layer includes a third magnetic layer and a fourth magnetic layer laminated on the third magnetic layer, and the saturation magnetic flux density of the fourth magnetic layer is higher than the saturation magnetic flux density of the third magnetic layer.

13. A magnetic recording apparatus comprising:
a magnetic recording medium;
a magnetic head according to claim 1, a moving mechanism configured to allow relative movement between the magnetic recording medium and the magnetic head which are opposed to each other with a spacing therebetween or in contact with each other;
a controller configured to position the magnetic head at a prescribed recording position of the magnetic recording medium; and
a signal processing unit configured to perform writing of a signal on the magnetic recording medium by using the magnetic head.

14. The magnetic head according to claim 1, wherein the second magnetic layer contains at least one element selected from the group consisting of Ru, W, Re, Os, Ir, Sm, Eu, Tb, Gd, Dy, Ho, Rh and Pd.

15. The magnetic head according to claim 1, wherein the second magnetic layer includes a third magnetic layer and a fourth magnetic layer laminated on the third magnetic layer, and the saturation magnetic flux density of the fourth magnetic layer is higher than the saturation magnetic flux density of the third magnetic layer.

* * * * *